United States Patent
Sheng et al.

(10) Patent No.: US 11,781,723 B2
(45) Date of Patent: Oct. 10, 2023

(54) ADAPTIVE LIGHT SOURCE WITH SPATIAL LIGHT MODULATOR

(71) Applicant: Texas Instruments Incorporated, Dallas, TX (US)

(72) Inventors: Zhongyan Sheng, Allen, TX (US); Shashank Dabral, Allen, TX (US); Ganapathy Sivakumar, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 17/849,472

(22) Filed: Jun. 24, 2022

(65) Prior Publication Data

US 2023/0058323 A1    Feb. 23, 2023

Related U.S. Application Data

(60) Provisional application No. 63/234,045, filed on Aug. 17, 2021.

(51) Int. Cl.
| | |
|---|---|
| *F21S 41/141* | (2018.01) |
| *F21S 41/63* | (2018.01) |
| *F21S 41/25* | (2018.01) |
| *F21V 23/04* | (2006.01) |
| *F21S 41/153* | (2018.01) |
| *F21W 102/13* | (2018.01) |

(52) U.S. Cl.
CPC ............ *F21S 41/63* (2018.01); *F21S 41/153* (2018.01); *F21S 41/25* (2018.01); *F21V 23/0442* (2013.01); *F21W 2102/13* (2018.01)

(58) Field of Classification Search
None
See application file for complete search history.

(56) References Cited

U.S. PATENT DOCUMENTS

| | | | |
|---|---|---|---|
| 2016/0377252 A1* | 12/2016 | Bhakta | F21V 23/003 362/520 |
| 2019/0017671 A1* | 1/2019 | Bhakta | F21S 41/675 |

* cited by examiner

*Primary Examiner* — Elmito Breval
(74) *Attorney, Agent, or Firm* — Michelle F. Murray; Frank D. Cimino

(57) ABSTRACT

An example includes a system, having: an illumination source configured to produce illumination light; and a spatial light modulator (SLM) optically coupled to the illumination source, the SLM comprising an array of picture elements. The SLM is configured to: receive the illumination light; direct, by a first portion of the picture elements, on state light in a first direction; and direct, by a second portion of the picture elements, off state light in a second direction. The example system includes imaging optics optically coupled to the SLM, the imaging optics configured to receive the on state light from the SLM and to project an image as an image portion of a beam; and non-imaging optics optically coupled to the SLM, the non-imaging optics configured to receive the off state light from the SLM and to project the off state light as part of the beam.

20 Claims, 16 Drawing Sheets

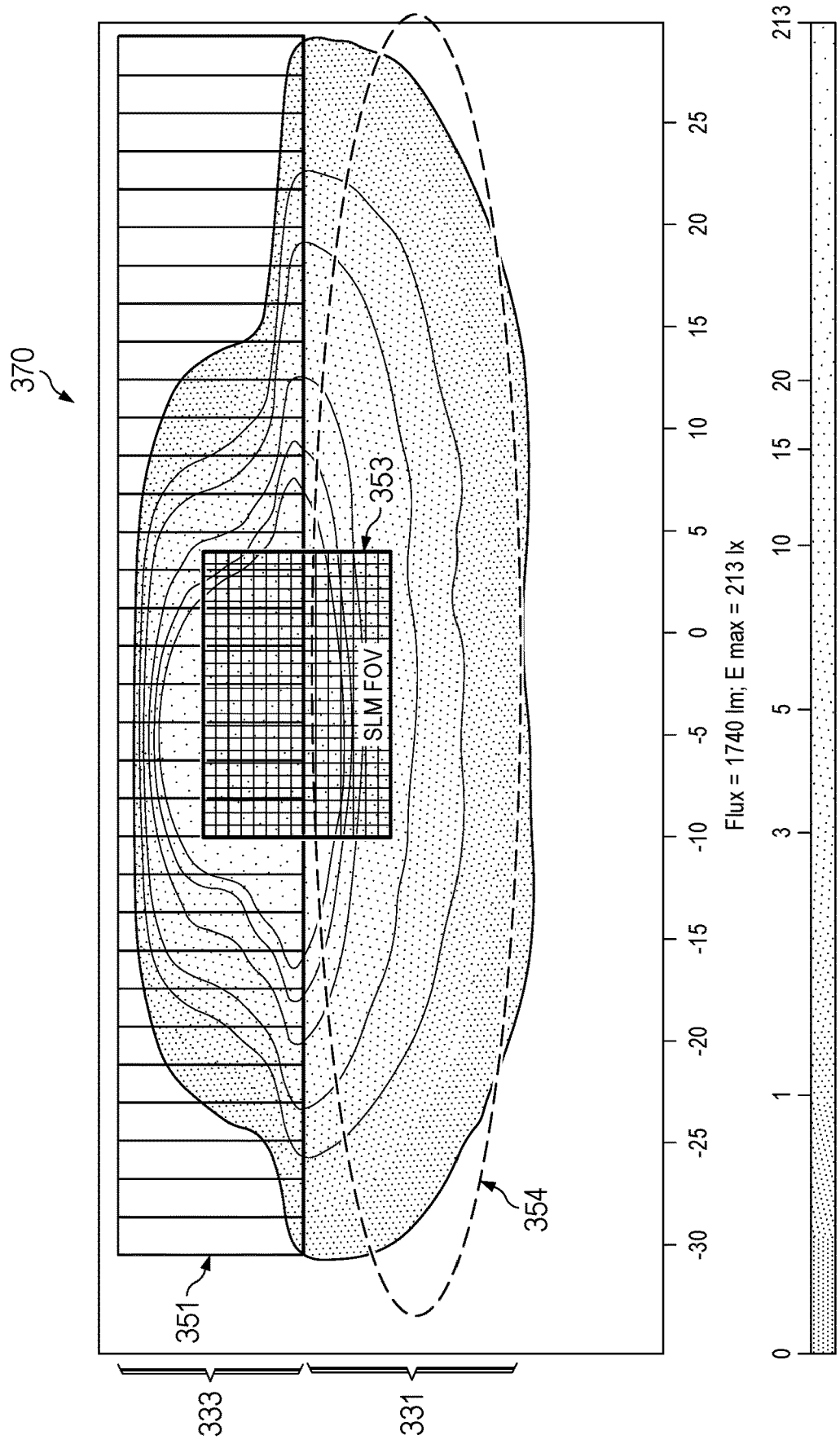

ADAPTIVE LIGHT SOURCE WITH SPATIAL LIGHT MODULATOR

CROSS-REFERENCE TO RELATED APPLICATIONS

This application claims the benefit of and priority to U.S. Provisional Application No. 63/234,045, filed Aug. 17, 2021, which Application is hereby incorporated herein by reference in its entirety.

TECHNICAL FIELD

This relates generally to adaptive light sources, and more particularly to a spotlight or headlight with a spatial light modulator (SLM) that projects light.

BACKGROUND

Light sources, including spotlights or headlights, are used in various applications, for example automotive, marine, trucking, railroad and aviation applications. Vehicular headlights are increasingly using adaptive technology to dynamically shape a projected beam. Recent advances include adaptive driving beam (ADB) headlights, where a beam projected from the headlight onto the roadway is adapted for various conditions as the vehicle travels along the roadway. ADB headlights can shape a projected beam to prevent glare from affecting drivers of oncoming vehicles while remaining in a high beam mode, where objects and the roadway in the far distance are brightly illuminated. The ADB headlights can also shape the projected beam to avoid glare from entering preceding vehicles, and can direct the projected light away from pedestrians or cyclists traveling alongside the roadway, standing along the roadway or at intersections. Use of ADB headlights can increase visibility to the driver of a vehicle by allowing "always on" high beam headlight operation, by automatically reducing the output of the headlight and by automatically increasing the output of the headlight as the vehicle encounters or passes by other vehicles, cyclists or pedestrians so as to use a bright headlight beam whenever possible for a given situation, increasing driver visibility.

SUMMARY

An example includes a system, having: an illumination source configured to produce illumination light; and a spatial light modulator (SLM) optically coupled to the illumination source, the SLM comprising an array of picture elements. The SLM is configured to: receive the illumination light; direct, by a first portion of the picture elements, on state light in a first direction; and direct, by a second portion of the picture elements, off state light in a second direction. The example system includes imaging optics optically coupled to the SLM, the imaging optics configured to receive the on state light from the SLM and to project an image as an image portion of a beam; and non-imaging optics optically coupled to the SLM, the non-imaging optics configured to receive the off state light from the SLM and to project the off state light as part of the beam.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which:

FIG. 3C illustrates an intensity diagram for an example beam pattern for a high beam mode of operation.

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Figure 1:
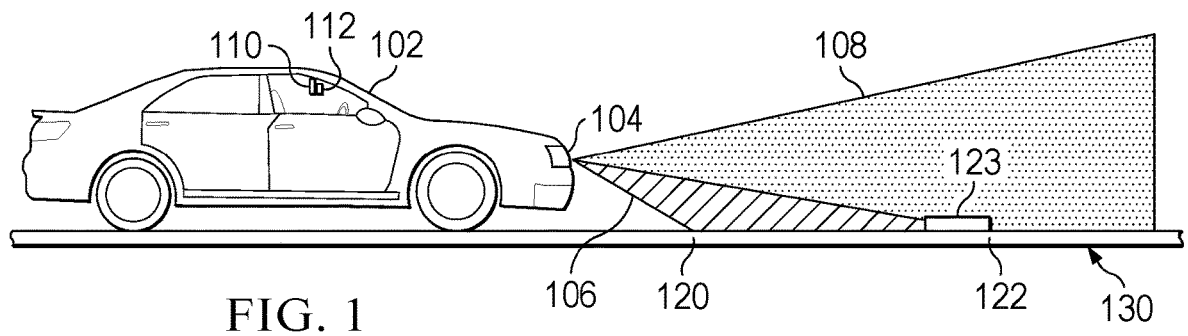
FIG. 1 illustrates a vehicle having an adaptive light source useful with the arrangements.

The making and using of example arrangements that incorporate aspects of the present application are discussed in detail below. It should be appreciated, however, that the examples disclosed provide many applicable inventive concepts that can be embodied in a wide variety of specific contexts. The specific examples and arrangements discussed are illustrative of specific ways to make and use the various arrangements, and the examples described do not limit either the scope of the specification, or the scope of the appended claims.

For example, when the term "coupled" is used herein to describe the relationships between elements, the term as used in the specification and the appended claims is to be interpreted broadly, and is not limited to connected or directly connected but instead the term "coupled" may include connections made with intervening elements, and additional elements and various connections may be used between any elements that are coupled. The term "optically coupled" is used herein. Elements that are "optically coupled" have an optical connection between the elements but various intervening elements can be between elements that are optically coupled.

The term "spatial light modulator" (SLM) is used herein. Types of SLMs that are useful with the arrangements include a liquid crystal on semiconductor (LCOS) device, a micro light emitting diode (microLED) device, a digital micromirror device (DMD) device, or a transmissive liquid crystal display (LCD) device. In the arrangements, SLMs receive illumination while displaying image patterns and the SLMs provide modulated light.

The term "pixel" is used herein. The term pixel is an abbreviation of the term "picture element." A pixel is the smallest addressable element used in a digital display. SLMs have pixels. A pixel is one element of an array of addressable picture elements that display a pattern on the SLM for modulating light. In one example, the SLM is a digital micromirror device and the pixels are formed by micromirrors. In other examples, the SLM is a reflective liquid crystal on silicon (LCOS) device and the pixels are liquid crystal cells, or the SLM is a transmissive LCD device and the pixels are again liquid crystal cells. The SLM can have thousands or millions of pixels arranged in rows and columns. In amplitude modulating SLMs, when the SLM is illuminated, the pixels can be described as being in an "on state" or in an "off state". In the arrangements, a pixel in an on state modulates the illumination light to produce on state light that is arranged to be projected as an image using imaging optics such as an image lens. A pixel in an off state modulates light to produce off state light that is directed away from the imaging optics. In this manner the SLM produces images that are projected by the image lens. In example arrangements, the on state light is reflected from a DMD SLM in a different direction than the off state light. In additional example arrangements, the on state light has a different polarization than the off state light, and the on state light is directed in a different direction than the off state light.

In example arrangements, an SLM is used in a headlight. A particular application is an automotive headlight. Automotive headlights support low beam mode and high beam mode operations. A headlight in high beam mode projects a beam to a far distance to increase visibility in the far distance from the vehicle, and provides a very bright, center weighted distribution to extend the visible field of view (FOV) for the driver. The far distance may be hundreds of meters ahead of the vehicle. When the vehicle with the automotive headlight encounters another vehicle traveling in the opposite direction on a roadway, a beam projected in high beam mode can cause glare that blinds or adversely affects the driver of the on-coming vehicle. Glare can also adversely affect the vision of drivers of preceding vehicles traveling in the same direction, or pedestrians, cyclists or animals that are along the roadway.

In a low beam mode, which may be the default mode of operation, the projected beam from the automotive headlight is arranged to illuminate the roadway in the near distance with respect to the driver, and to illuminate the lane markers along the sides of the roadway or to illuminate curbs of the roadway, in front of the driver and on either side of the vehicle. The low beam has a limited range and has a horizontal boundary at the upper end of the drivers' field of view to avoid blinding other drivers, cyclists or other people using the roadway on foot. The pattern projected in low beam mode has a wide base pattern in the near distance to give the driver visibility of the curbs and of the conditions along the sides of the roadway. In the low beam of operation, the beam is arranged to illuminate the sides of the road directly in front of the vehicle to aid the driver in traversing curves or in turning from the roadway onto intersecting roads by illuminating lane marker lines and the shoulder of the roadway, while in the middle distance the beam is has a more center weighted distribution restricted to the roadway to avoid creating glare. At higher speeds use of the low beam mode restricts the driver's visibility to see distant objects, reducing the reaction time the driver has to maneuver, and at these higher speeds the high beam mode is preferred.

Light sources with adaptive beams that enable increased use of high beam modes of operation while avoiding unwanted glare are needed. Efficiency of these systems is important to reduce power requirements.

In an example arrangement, an illumination system is implemented using an adaptive light beam. In an example application the illumination system is an automotive headlight. Automotive headlights increasingly use SLMs. Use of SLMs in an automotive headlight enables smart headlight technology. In smart headlights, the automotive headlight can be operated in conjunction with vehicle navigation systems, location systems, and traffic information systems. In some examples, the automotive headlight can display graphic images providing visual information directed to the driver by projecting images on the roadway in the driver's field of view. Information about upcoming turns or exits, distances to a destination, upcoming construction that the vehicle is approaching, notices regarding accidents, inclement weather, congestion, and locations of services such as fuel, rest stops or hospitals ahead of the vehicle can be provided as visual information displayed on the roadway. Smart headlight technology advantageously communicates information to the driver displayed on the roadway itself, so that the driver can receive the information without looking away from the roadway, increasing safety over systems requiring the driver to look away from the roadway to view a display or monitor. ADB and smart headlight systems are increasingly being developed and used in automobiles, trucks and commercial vehicles. Energy efficiency of these systems is an important consideration to preserve battery power.

The arrangements are applicable to lights that project a beam, including spotlights for automotive, marine, trucking, railroad and aviation headlights, and outdoor illumination. The arrangements are particularly applicable to lights that project a beam that changes shape, and are further applicable to light sources for vehicles where the projected beam changes shape to adapt to conditions as the vehicle travels.

In example arrangements, an apparatus includes an SLM in a headlight. The SLM displays a pattern on an array of pixels. The SLM receives illumination light and projects modulated light from pixels in an on state to imaging optics to project an image as part of the beam projected from the headlight. The SLM projects light from pixels in an off state to non-imaging optics to project off state light as another part of the beam projected by the headlight. Additional light sources in the headlight can project light as part of the beam, including for example a matrix LED system that can be used to project light during a high beam mode of operation, and another base light source can be used to project light in a base light pattern as part of the beam pattern for a low beam mode of operation, and which can be used to provide part of a beam pattern for the high beam mode of operation.

In the arrangements, the SLM can project beam patterns to enhance and adapt a beam projected by the headlight, and for an example automotive headlight, can project graphic images on a roadway. In an example arrangement, the SLM can be arranged to have a first portion that projects light in a high beam mode of operation, and a second portion that projects light in a low beam mode of operation and in the high beam mode of operation, the second portion can be used to project desired beam patterns and can be used to project graphic images on the roadway. In the arrangements, light from pixels in the DMD that are in the off state is used to form a base light pattern that is part of the beam, which increases efficiency of the system.

In FIG. 1, a vehicle 102 is shown traveling on a roadway 130. The vehicle 102 is shown in cross section with an automotive headlight 104, the vehicle 102 can have two headlights or more. Automotive headlight 104 projects a low beam portion 106, which is used in a low beam mode of operation and which may be used in a high beam mode of operation, and a high beam portion 108, which is used in a high beam mode of operation. The high beam portion 108 illuminates the roadway 130 at a farther distance ahead of the vehicle 102 (when compared to the low beam portion 106), starting at position 122 on the roadway, while the low beam portion 106 illuminates the roadway at a nearer distance portion starting at position 120 and extending to position 122. A sensor 112, which can be a camera or other imaging system, a machine vision system, a radar or sonar sensing system, faces forward. In this particular example, sensor 112 is mounted on the rear surface of a rear view mirror 110. Alternatively, the sensor 112 can be mounted elsewhere on the vehicle and directed forward.

The automotive headlight 104 can be operated to provide ADB operation. In an example ADB operation, when the sensor 112 detects an oncoming vehicle traveling in an adjacent lane on the roadway 130, for example, the operation of the automotive headlight 104 can be adapted by turning off the illumination of high beam portion 108, or by shaping the high beam portion 108 of the beam to prevent glare from affecting the driver of the oncoming vehicle. Similarly, when the sensor 112 detects a preceding vehicle on the roadway 130 ahead of vehicle 102, such as a slower vehicle in the same lane or in an adjacent lane moving in the same direction as vehicle 102, the high beam portion 108 can be adaptively adjusted. The adaptive adjustments can be made by turning off the high beam portion 108, or by shaping the high beam portion 108 to create a dimmed pattern in areas where the high beam pattern would otherwise affect the driver of the preceding vehicle, so that glare does not enter the preceding vehicle. In additional examples, the sensor 112 can also detect pedestrians, cyclists, or animals along the roadway and the high beam portion 108 can be turned off, or adaptively shaped, to avoid blinding the pedestrians, cyclists, or animals. In another example, the automotive headlight 104 can be adapted to prevent bloom or unwanted illumination of reflective road signs, which can cause the reflective road signs to white out and appear too bright to the driver, obscuring the symbols on the road sign. The automotive headlight 104 can also be operated in different modes at lower speeds, such as decreasing power to high beam portion 108 or in a low beam mode of operation, disabling high beam portion 108, so that in the low beam mode of operation, glare from the beam projected by automotive headlight 104 does not adversely impact pedestrians or drivers of cars moving in different directions, vehicles standing at intersecting roads, or preceding vehicles.

A graphic image area 123 is shown being projected from the automotive headlight 104. This graphic image area 123 can be used for displaying graphic images. In an example smart headlight system, graphic images that convey information useful to the driver can be provided by operating the automotive headlight 104 in conjunction with navigation, weather, position or traffic information systems. Example graphic images displaying messages such as "construction ahead 10 miles" or "take next exit" can be projected onto the roadway at a sufficient distance ahead of the vehicle 102 to allow time for the driver to react appropriately. As the speed of the vehicle 102 increases, this distance becomes greater, similarly as the vehicle 102 slows, this distance becomes less. In an example the graphic image area 123 may be 50 meters or more from the vehicle when the vehicle is traveling at highway speeds. Warnings about hazards or traffic accidents the vehicle is approaching can be displayed in graphic image area 123 to give the driver time to change lanes or slow travel before reaching the hazard or accident. By providing the messages displayed in graphic image area 123 from automotive navigation and location systems, the driver can receive information without the need to look away from the roadway 130 to view a display, monitor, or handheld device, increasing vehicle safety. Messages can also be displayed that relate to the operations of sensor 112, which may detect animals or objects in the roadway, stopped or slowed cars ahead, oncoming traffic, or other hazards the vehicle 102 is approaching.

Figure 2:
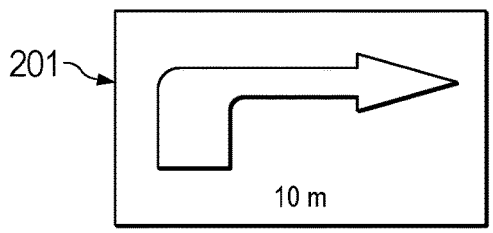
FIG. 2 illustrates an example graphic image that can be projected onto a roadway using an arrangement.

FIG. 2 illustrates, in a projection view, an example graphic image 201 that can be projected onto the roadway, and which could appear in a graphic image area (see 123 in FIG. 1). In this example, a smart headlight is operated in conjunction with the navigation system of the vehicle, and the graphic image 201 indicates an upcoming right turn and a distance. The graphic image 201 is projected at a distance ahead of the vehicle that is sufficient to give the driver time to read, understand, react and respond to the navigational cue of the graphical image. In order to provide the image on the roadway, the graphic image is projected at a low angle, and at a distance of up to 50 meters or more from the automotive headlight, which requires a relatively high resolution so that the projected image is not blurred or pixelated in appearance. In example arrangements, an SLM with sufficient resolution is used in an automotive headlight to provide the graphic images. In a particular example arrangement, the SLM may have more than 1 million pixels.

Figure 3A:
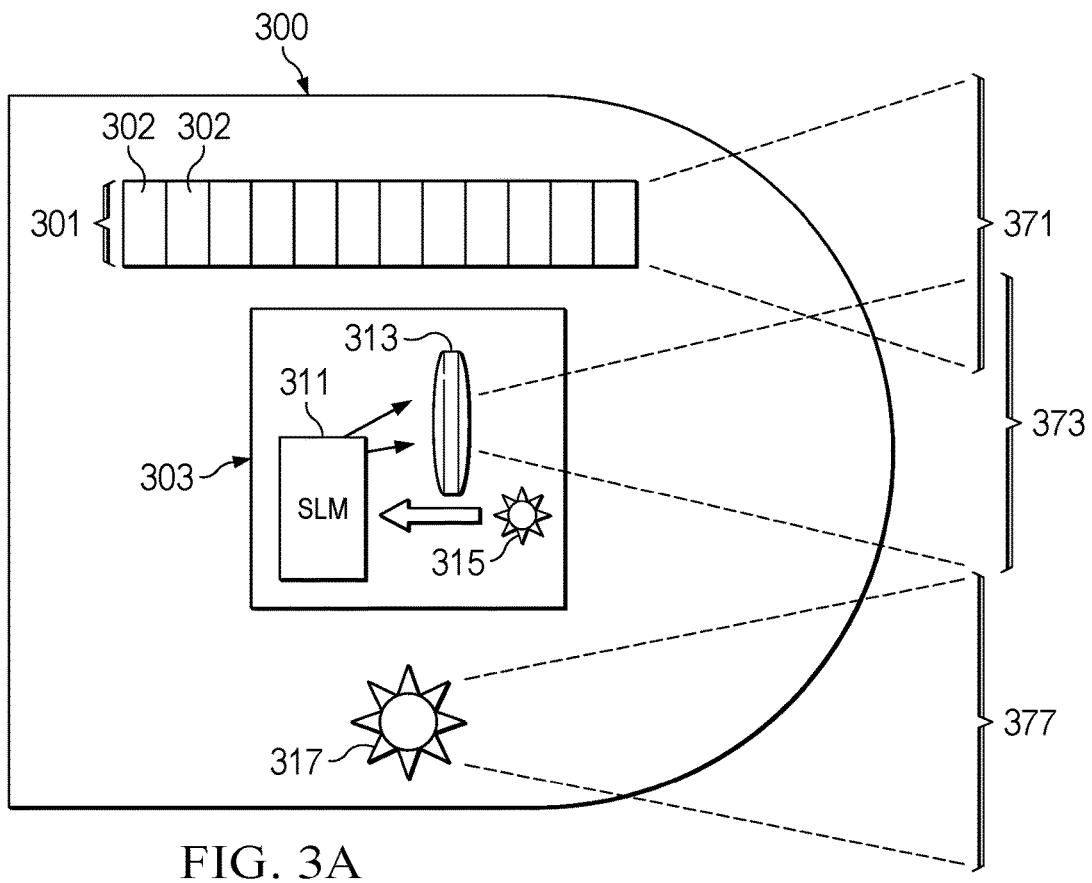
FIG. 3A illustrates in a block diagram an example adaptive automotive headlight.

FIG. 3A illustrates, in a block diagram, an example automotive headlight 300 having multiple light sources which can be used with an arrangement. In FIG. 3A, automotive headlight 300 includes at least three light sources: a matrix LED 301; an SLM system 303; and a base light source 317. The matrix LED 301 includes multiple LED segments 302, for example 20-80 segments, which can be individually addressed. The LED segments 302 can be selectively turned off, or on, and in some arrangements, the intensity of the light from LED segments 302 can be individually controlled by varying current to the individual LED segments 302. The matrix LED 301 is arranged so that the light projected from the matrix LED 301 forms part of a high beam portion 371 as a portion of a projected beam. The light from the matrix LED 301 is directed at a far distance from a vehicle, for example several hundred meters or thousands of feet, and is used to illuminate areas far ahead of the driver when the vehicle is operated at highway speeds, on unlit roads, or in rural areas.

Use of the matrix LED 301 provides bright, relatively high lumen light at relatively low power. LEDs used in matrix LED 301 can provide very white light at high color temperature levels such as 6000 Kelvin or more, providing excellent visibility to the driver of the vehicle. By turning individual LED segments 302 of the matrix LED 301 on or off, or by varying the intensity of the light from the individual LED segments 302, the matrix LED 301 can be used to adaptively shape the high beam portion 371 of the light projected from the automotive headlight 300. In an example, individual LED segments 302 can be turned off to provide shadows or dark areas where an oncoming vehicle is detected, to avoid glare from the automotive headlight 300 from affecting the driver of the oncoming vehicle. In some examples, some of LED segments 302 can be directed to illuminate corner areas so that when the vehicle is turned from a straight direction, additional light is provided on the edge or shoulder of the roadway to illuminate the lane marker lines as the vehicle travels around a curve or corner, aiding the driver in steering the vehicle. Navigational information about the roadway can be used with the vehicle location, for example the navigation system can work with matrix LED 301 to dynamically activate corner lighting in advance of the vehicle traversing an upcoming curve or turn.

The automotive headlight 300 includes a SLM system 303, and may include additional components. The SLM system 303 includes an SLM subsystem 311, an illumination source 315, and imaging lens 313, and may also include additional components. The SLM system 303 provides patterned light 373 and/or graphic images projected from the automotive headlight 300. In an example, a portion of the light from the SLM subsystem 311 is directed to a high beam portion of the beam projected from the headlight, and another portion of the light from SLM subsystem 311 is directed to a graphic image display region and to a low beam portion. The illumination source 315 can be implemented using one or more lasers, or by using one or more LED. A white LED can be used. A blue LED combined with a yellow and/or green phosphor can be used to implement illumination source 315 to provide white light as illumination to the SLM subsystem 311. A red LED, a blue LED, and a green LED can be used. Other colors can be used.

A base light source 317 is also provided in automotive headlight 300, which provides a base light 377 as part of the beam. In an example low beam mode of operation, the matrix LED 301 is not used, as the light from matrix LED 301 is too bright for low beam operation, and base light source 317 provides a base light 377. In some arrangements, base light source 317 is always on to provide a portion of a low beam mode pattern and is used in a high beam mode of operation to fill the area of the roadway in the near distance with base light 377. In some example arrangements, in the high beam mode of operation, the base light source 317 is not used, and the beam is narrowed so that the only the matrix LED 301 or individual LED segments 302 and SLM system 303 may be used. In some arrangements, base light source 317 can also be turned on in daylight conditions to provide a daylight driving indicator, increasing the visibility of the vehicle to oncoming traffic in daytime conditions. Base light source 317 can be implemented using an LED, a halogen bulb, or another automotive light bulb. In addition, a portion of the patterned light 373 from SLM system 303 can be used to provide graphic images and additional light to fill the beam pattern in the near distance to the vehicle in low beam operations. The SLM system 303 can also be used in high beam operations. By providing these sources of light in the automotive headlight 300, ADB features and smart headlight features can be implemented.

Figure 3B:
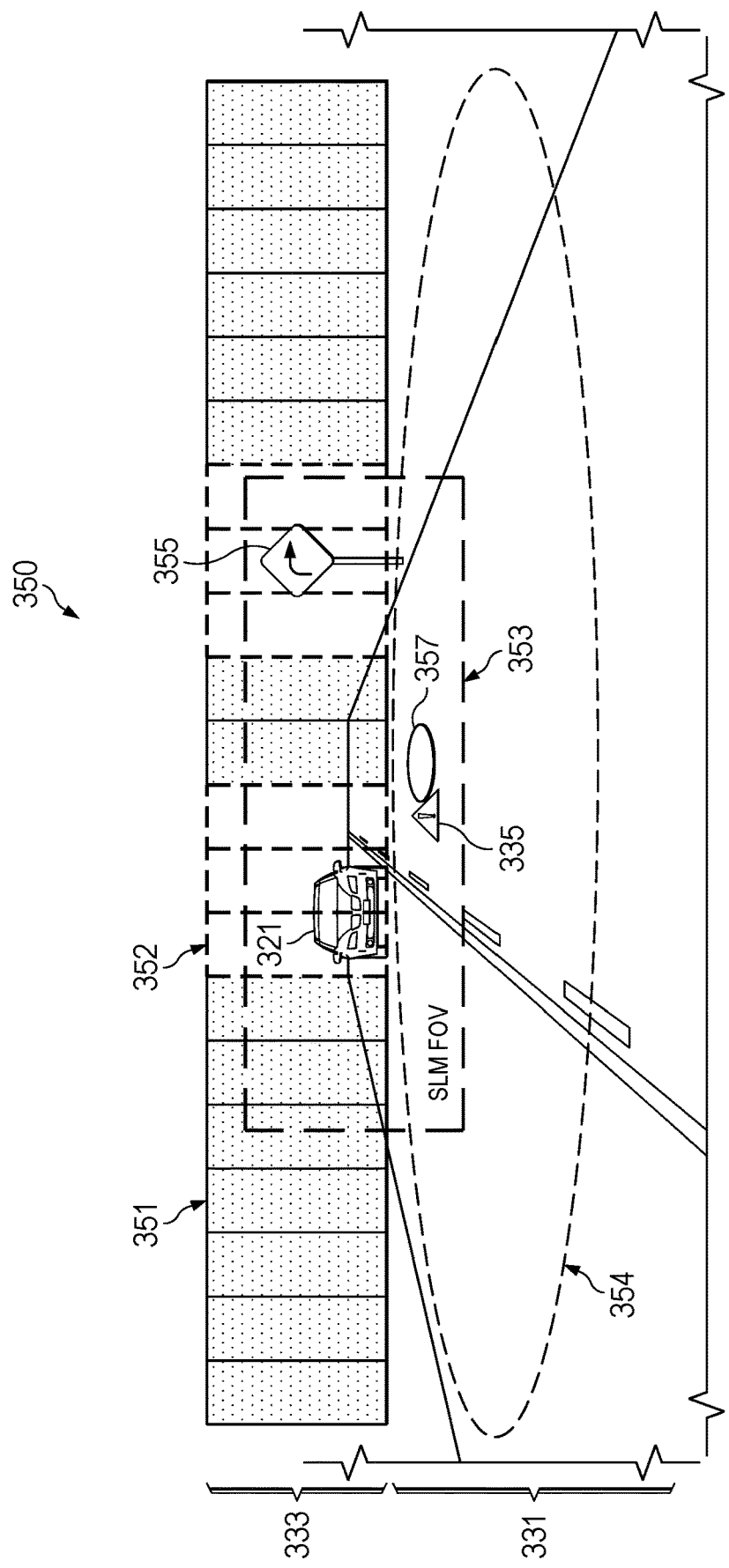
FIG. 3B illustrates in a diagram an example projected beam from a driver's field of view.

FIG. 3B illustrates, in a projection view, a beam pattern 350 seen from the driver's field of view (FOV) of a vehicle including an automotive headlight, such as automotive headlight 300 in FIG. 3A. FIG. 3B indicates which of the three light sources in an automotive headlight provides the light in different portions of the beam pattern 350 (for example, see matrix LED 301, SLM system 303 and base light source 317 of the automotive headlight 300 in FIG. 3A). In FIG. 3B, beam pattern 350 has a high beam light portion 333 at the upper part of the FOV and a low beam light portion 331 shown closer to the vehicle, in the lower part of the FOV. The low beam light portion 331 illuminates the roadway closest to the vehicle and to the driver, at a near distance, while the high beam light portion 333 illuminates the roadway at a far distance. The two light portions 333, 331 can overlap. In an example, the high beam light portion 333 is illuminated by a matrix LED (see matrix LED 301 in FIG. 3A) with individual segments (see LED segments 302 in FIG. 3A) that output segment light 351. In the illustrated example of FIG. 3B an oncoming vehicle 321 is detected in an adjacent lane to the vehicle projecting beam pattern 350, and some LED segments of the matrix LED (see matrix LED 301 and LED segments 302 in FIG. 3A) are turned off, as shown by the dashed line segments 352 in FIG. 3B. The high beam light portion 333 is adapted in this example by turning off light from the matrix LED (see matrix LED 301 in FIG. 3A) directed towards the oncoming vehicle 321, avoiding glare from blinding the driver of oncoming vehicle 321. As the two vehicles continue traveling towards one another, the segments of the matrix LED (see matrix LED 301 and LED segments 302 in FIG. 3A) that are turned on and off can be adaptively modified to maintain a dimmed portion in the high beam light portion 333 where light would otherwise be directed towards the oncoming vehicle 321. In FIG. 3B, the dashed light segments 352 indicate areas dimmed to avoid glare on the oncoming vehicle 321.

The SLM light 353 in the area labeled "SLM FOV" in FIG. 3B is provided by an SLM system (see SLM system 303 in FIG. 3A). SLM light 353 has a portion that is part of the high beam light portion 333 and a portion that is part of low beam light portion 331. The SLM light 353 corresponding to the SLM FOV overlaps both high beam light portion 333 and low beam light portion 331. In the example illustrated in FIG. 3B, a road sign 355 is detected adjacent the roadway. The high beam light portion 333 is dimmed in the area that would otherwise strike the road sign 355 by turning off some segments of the matrix LED (see matrix LED 301 and LED segments 302 in FIG. 3A), creating a dimmed region (shown as dashed line segments 352) in the SLM light 353 and in the high beam light portion 333) that corresponds to the position of the face of the road sign 355. The dimming is performed to maintain clear visibility of the road sign 355, which is reflective. When too much light strikes a reflective road sign, it can "bloom", causing glare to the eyes of the driver so that the symbols on sign are not legible, losing the information on the road sign. In this example, both the high beam light portion 333 from the matrix LED (see matrix LED 301 and LED segments 302 in FIG. 3A), which is shown as segment light 351 in FIG. 3B, and the SLM light 353, are dimmed in the area corresponding to road sign 355 to increase visibility of the road sign 355.

In the example beam pattern 350 shown in FIG. 3B, a sensor (not shown in FIG. 3B, see sensor 112 in FIG. 1) has also detected a defect 357, such as a pothole, in the roadway ahead of the vehicle. This defect 357 is illuminated by the low beam light portion 331 and by a portion of the SLM light 353. In response to identifying the defect 357 in the roadway, a graphic warning symbol 335 is projected onto the roadway at a position proximate to the defect 357. The symbol is intended to alert the driver to the defect 357. In FIG. 3B, base light 354 is projected onto the roadway to illuminate the roadway in the low beam light portion 331. In areas outside of the area illuminated by high beam light portion 333, the base light 354 is provided by a base illumination source such as a base light source (see 317 in FIG. 3A). In an example operation, the base light 354 is provided in both low beam and high beam operations, and in some arrangements the base light source (see 317 in FIG. 3A) may also be left on in both daytime and nighttime conditions, so that the base light 354 is always on when the vehicle is moving. The base light 354 can be provided as part of the low beam light portion 331 by base light source (see base light source 317 in FIG. 3A) which can be implemented by an LED or halogen bulb, for example.

FIG. 3C illustrates another intensity graph plotting an example beam pattern 370 that may be used with an arrangement. Beam pattern 370 illustrates a high beam mode of operation. In FIG. 3C, the intensity graph is overlaid with symbols indicating which portions of an automotive headlight produce parts of the beam pattern 370 (for example, see matrix LED 301, SLM system 303, and base light source 317 in automotive headlight 300 in FIG. 3A). In FIG. 3C, part of the high beam light portion 333 is provided by a matrix LED (see 301 in FIG. 3A), and is indicated as a rectangular array with segment light 351 shown from individual LED segments. High beam light portion 333 is also illuminated by part of the field of view (FOV) of a spatial light modulator (SLM), as indicated by the SLM light 353, with light from individual pixels shown in a two dimensional grid. The upper part of SLM light 353 provides the bright illumination at the center of the high beam portion 333. Low beam light portion 331, which is nearer to the driver and appears at the bottom of the FOV of beam pattern 370, is provided by the base light source such as base light source 317 in FIG. 3A. The base light portion is shown in the intensity graph with a wide base light 354. The lower portion of SLM light 353 forms part of the low beam light portion 331, and this portion of the SLM can be used to display graphic images or other higher resolution images (for example, see the graphic warning symbol 335 in FIG. 3B, or the symbol of FIG. 2). The beam pattern 370 in a high beam mode of operation is formed by combining light from the matrix LED (301 in FIG. 3A), the SLM system (see SLM system 303 in FIG. 3A), and the base light source (see base light source 317 in FIG. 3A), to increase illumination onto the roadway at both a near distance close to the driver, and at a far distance, the high beam light portion 333 of the beam pattern 370 providing the illumination at the far distance. The SLM system provides patterned light in SLM light 353 to both the high beam light portion 333 and to the low beam light portion 331, of the beam pattern 370. In FIG. 3C, the flux is shown as equal to 1740 lumens (lm), and the maximum field strength E max is shown on the X axis at 213 lux (lx), which can be seen as occurring in the center of the diagram using the dotted gradients. The dotted patterns are shown in a key at the bottom to illustrate where the more and less intense light in beam 370 is located in the field of view. The x-axis in FIG. 3C illustrates the field of view in degrees from an origin at the center of the diagram.

Figure 3D:
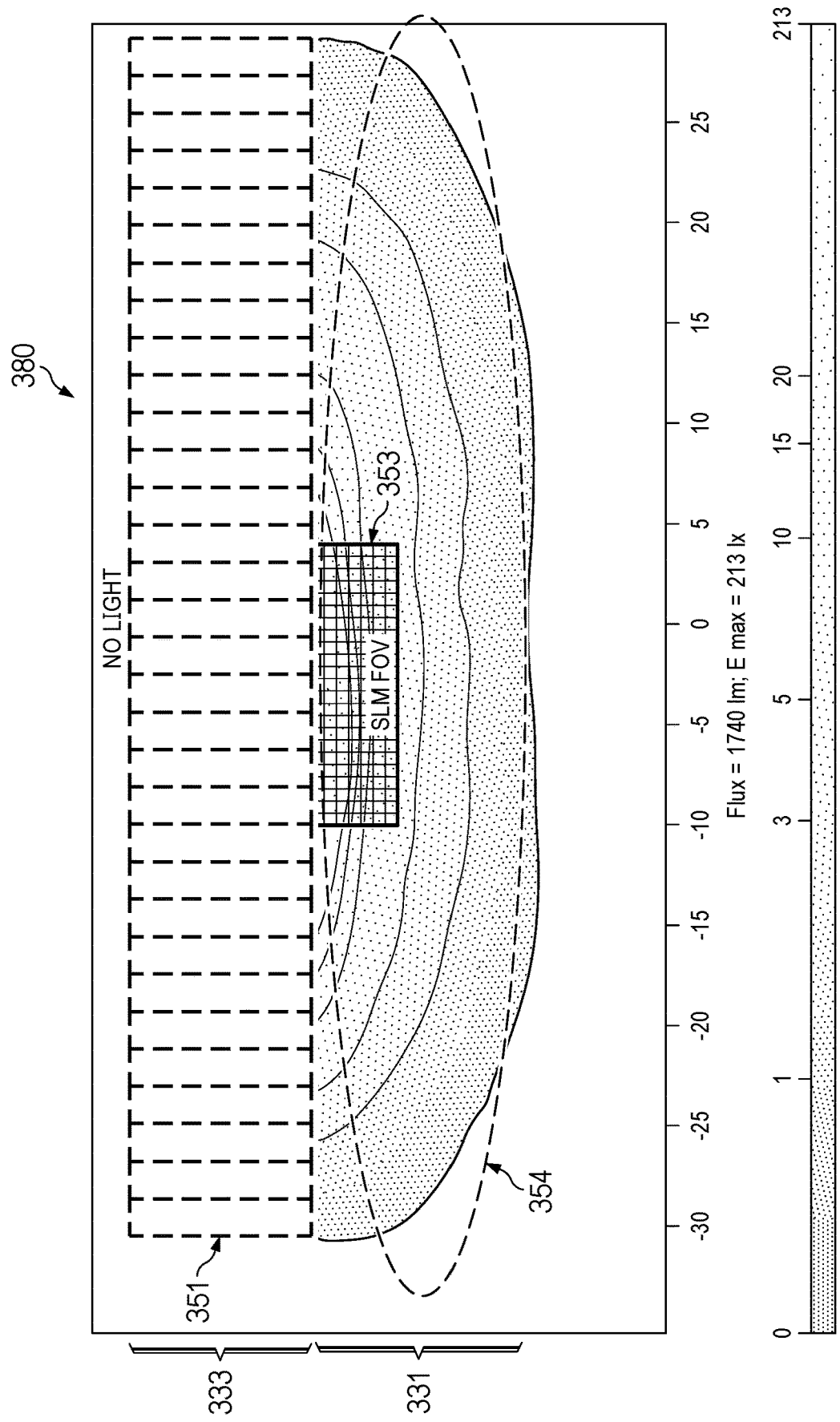
FIG. 3D illustrates in another intensity diagram another beam pattern for a low beam mode of operation.

FIG. 3D illustrates in another intensity diagram a beam pattern 380 for a low beam operation. In FIG. 3D, the high beam light portion 333 is no longer illuminated. The matrix LED (see matrix LED 301 in FIG. 3A) is turned off or power is reduced to darken that portion of the beam pattern 380, as shown by the segment light 351 that are labeled "NO LIGHT" in FIG. 3D. An upper portion of the SLM light 353 in the SLM FOV is not illuminated as shown in FIG. 3D, so that those pixels of the SLM (see 311 in FIG. 3A) are not projecting light for the beam pattern 380. The x-axis in FIG. 3D illustrates the field of view in degrees from an origin at the center of the diagram.

In FIG. 3D, in the low beam mode of operation, the low beam light portion 331 of the beam pattern 380 is illuminated. The low beam light portion 331 is illuminated by the base light 354 from the base light source (see base light source 317 in FIG. 3A) and a portion of the SLM light 353 in the SLM FOV, which shown as a partially lit rectangle. Graphic images can be displayed on the roadway in the low beam operation using the pixels on the SLM (see 311 in FIG. 3A) that correspond to the lower portion of the SLM light 353. Again in FIG. 3D, as in FIG. 3C, the flux is shown as equal to 1740 lumens (lm), and the maximum field strength E max is shown as 213 lux (lx). The dotted patterns are shown in a key at the bottom of FIG. 3D to illustrate where the more and less intense light in beam 370 is located in the field of view.

In high beam operation of FIG. 3C, where maximum illumination is needed, all of the light sources in the automotive headlight can be used, including the matrix LED (see matrix LED 301 in FIG. 3A), the SLM system (see SLM system 303 in FIG. 3A) and the base light source (see base light source 317 in FIG. 3A). In contrast, in the low beam operation illustrated in FIG. 3D, the matrix LED 301 can be deactivated or individual segments such as 302 in FIG. 3A can be deactivated, or current can be reduced to dim the matrix LED, and a portion of the SLM light 353 from SLM system (see SLM system 303 in FIG. 3A) is not used, while another portion is used.

Figure 4A:
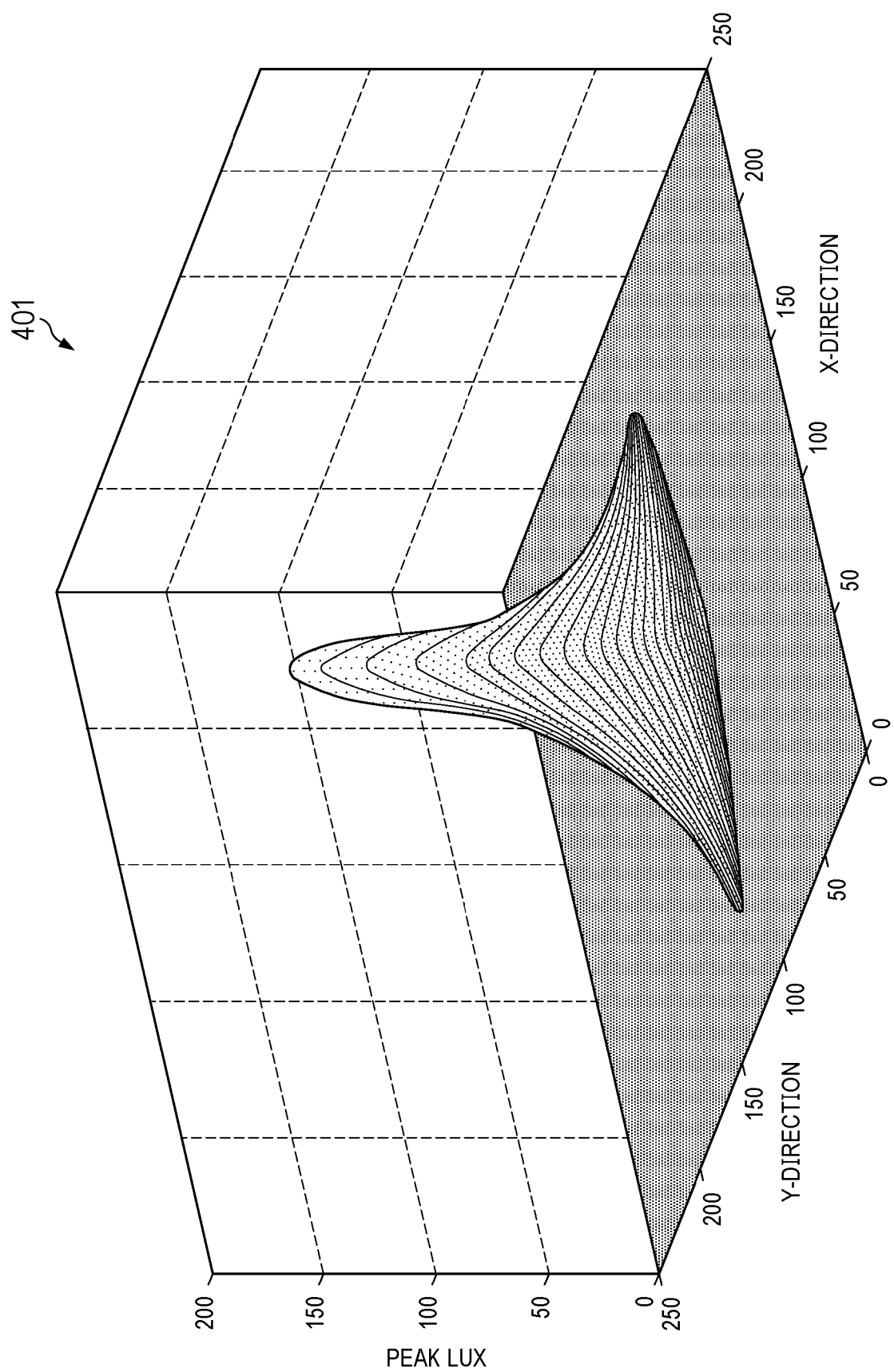
FIG. 4A illustrates in a two dimensional intensity graph a beam pattern for use with an adaptive headlight.

FIG. 4A illustrates, in an intensity graph, a beam pattern 401 that may be used with an arrangement. FIG. 4A illustrates in peak lux (lumen/m$^2$) on the vertical axis the concentration of light in a central portion of the beam pattern, while the remaining areas are dark. The beam pattern appears at about 100 degrees from the origin, as shown on the Y axis labeled "Y-DIRECTION." The beam pattern is about 100 degrees across, as shown using the scale on the X axis labeled "X-DIRECTION." The beam pattern is dark or nearly dark at the base and has a peak intensity of about 150 lux, as shown on the vertical axis. Portions of an automotive headlight used to form the highest intensity illumination in the beam pattern, such as the matrix LED (see matrix LED 301, in FIG. 3A) and the SLM system (see SLM system 303 in FIG. 3A) are arranged to output a pattern with a high peak intensity in the central portion, and low or zero intensity at other portions. In a high beam mode of operation such as is illustrated in FIG. 3C, the beam is shaped to provide illumination in the central portion of the field of view of the driver at a far distance, with a pattern such as shown in FIG. 4A indicating a center weighted distribution of the beam projected from a headlight.

Figure 4B:
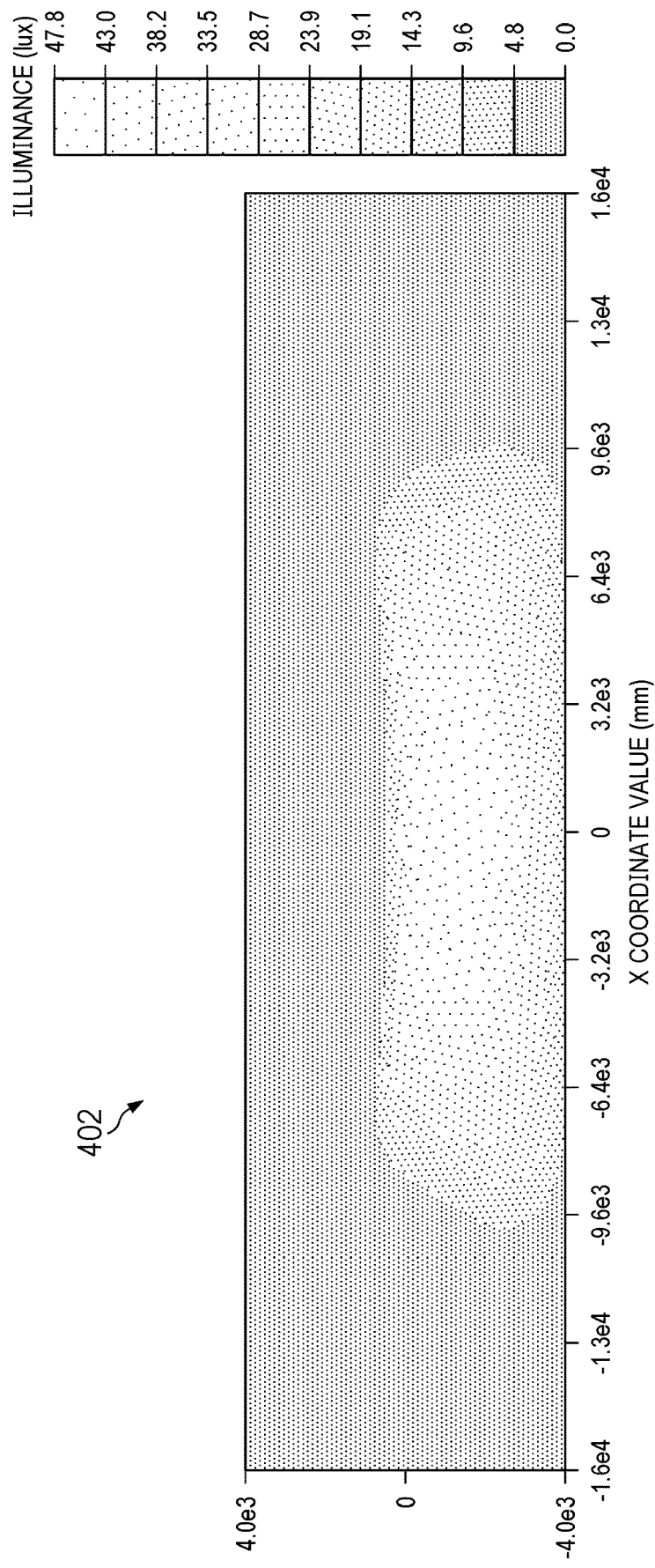
FIG. 4B illustrates in an intensity plot a beam pattern for use with an adaptive headlight.

FIG. 4B illustrates, in another intensity diagram 402, an example low beam pattern as seen across the x-axis, which is plotted in millimeters (mm), with the field of view in millimeters on the y-axis. In FIG. 4B, the intensity is plotted in lux as shown in the key. As shown in FIG. 4B, the central portion of the beam pattern in the bottom half of the field of view, corresponding to the near distance in the driver's FOV, has a high intensity, while the outer portions have a low or zero intensity, and the upper portion in this example beam pattern has low intensity, indicating a pattern for a low beam operation. Light in this low beam pattern is projected at a near distance.

Figure 5A:
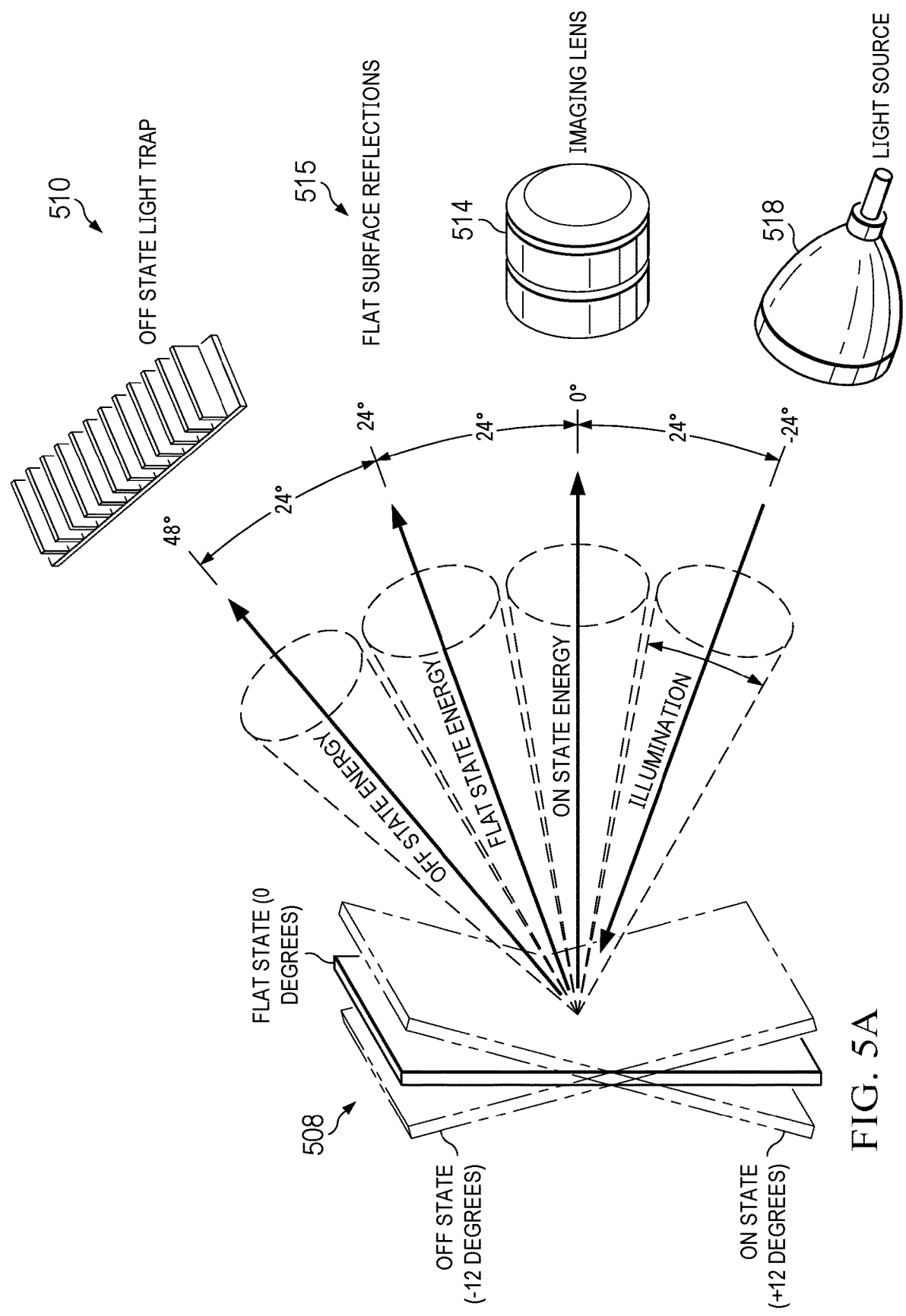
FIG. 5A illustrates the operations of an example digital micromirror device that is useful in certain arrangements.

FIG. 5A illustrates, in a projection view, the operation of an example reflective micromirror 508 that provides one pixel of a digital micromirror device (DMD) that might be used as the SLM in an arrangement. In a DMD, the pixels are formed using movable micromirrors that reflect illumination light. The surface of the micromirrors can be formed of aluminum or another reflective metal, or of a metal with a reflective coating. The movable micromirror 508 is mounted on a hinge (not shown) that tilts the surface of the micromirror in response to a voltage. The voltage applied to the micromirror corresponds to a data bit stored in an addressable memory cell associated with the pixel. A DMD has many thousands or even millions of these pixels such as micromirror 508 arranged in rows and columns in a two dimensional array, and the pixels have associated addressable memory cells for storing image data. The DMD and the memory can be switched many times per second to display patterns that, when illuminated, provide images for projection. In response to stored data, a micromirror can be in an ON state, tilting in a first direction, or in an OFF state, tilting in a second direction opposite to the first direction. The micromirror 508 tilts to a predetermined angle, so that illumination light incident on the surface of the mirror reflects in either an "ON STATE" direction or an "OFF STATE" direction. The amount of tilt angle that the micromirror will move depends on the particular manufacturing characteristics, in some examples a tilt angle of +/−12 degrees is used, in other examples a tilt angle of +/−17 degrees is used, and other tilt angles could be used. In the illustrated example of FIG. 5, the tilt angle is +/−12 degrees. The micromirror 508 has a FLAT state position when the device is not powered, where the mirror does not tilt. In operation of the DMD, no illumination is applied when the micromirrors are in the FLAT state, which is used when no power is applied to the device, and all the micromirrors take the same flat position (no tilt).

In FIG. 5A light is shown in four directions or cones corresponding to illumination light directed towards the surface of the micromirror 508, and to light reflected from the surface of the micromirror for three different positions. In this example, the light source 518 is positioned to project light towards the micromirror 508 at an angle of −24 degrees below a horizontal plane. The horizontal plane is normal to the surface of the micromirror 508 in the FLAT state, which is labeled as 0 degrees on the vertical axis, while the horizontal plane is labeled 0 degrees on the horizontal axis. In the FLAT state, the incident light, which comes from light source 518 at −24 degrees, is reflected at +24 degrees to the horizontal as shown in FIG. 5 as the cone 515 labeled "FLAT SURFACE REFLECTIONS", that is the angle of reflection is equal to and opposite from the angle of incidence. As the micromirror 508 is tilted to an ON state position of +12 degrees from vertical, and to an OFF state position of −12 degrees from vertical, the reflected light is projected at different angles with respect to the horizontal plane. The flat state is used when no power is to the system and all the mirrors in a DMD take the same position, so that in operations, no illumination is provided (as no pattern can be displayed when all the micromirrors are in the flat state.) When the micromirror 508 is in an ON state, the mirror tilts +12 degrees from vertical and light reflected from the surface of the mirror is reflected at an angle of zero degrees as shown in the cone labeled "ON STATE ENERGY", due to the −24 degree direction that the beam comes to the mirror, the tilt of the mirror of +12 degrees, and the corresponding reflection. The ON STATE ENERGY light is directed to an imaging lens 514, and projected from the system. The OFF state tilt is a negative 12 degrees, (−12 degrees), so that the light reflected in the off state leaves the micromirror 508 at an angle of 48 degrees, as shown by the cone labeled OFF STATE ENERGY in FIG. 5A. In the example of FIG. 5A, the off state light is directed to a light trap 510, which is thermal sink. The different angles that result from the ON state and the OFF state operations allow an SLM system to separate the on state light which can form patterned light that is directed to an imaging lens 514 to project a desired image. The off state light can be directed away from the imaging lens 514, while the illumination light physically is separated from the reflected on state light, so no interference occurs. Because the micromirror 508 can be rapidly switched and the DMD can display different image patterns many times per second, fixed and moving images can be projected using the micromirror 508.

In the example of FIG. 5A, the light reflected from the mirror in the OFF state is not used but is collected in a light trap 510 labeled "OFF STATE LIGHT TRAP", which can be cooled to form a thermal sink that dissipates thermal energy However, in the arrangements, the light reflected when the micromirror is in the OFF state is not directed to a light trap. Instead, in the arrangements the light reflected from the micromirror in the OFF state is used as part of the light projected from a headlight, increasing efficiency of the headlight and reducing power supplied to other light sources in the headlight.

Figure 5B:
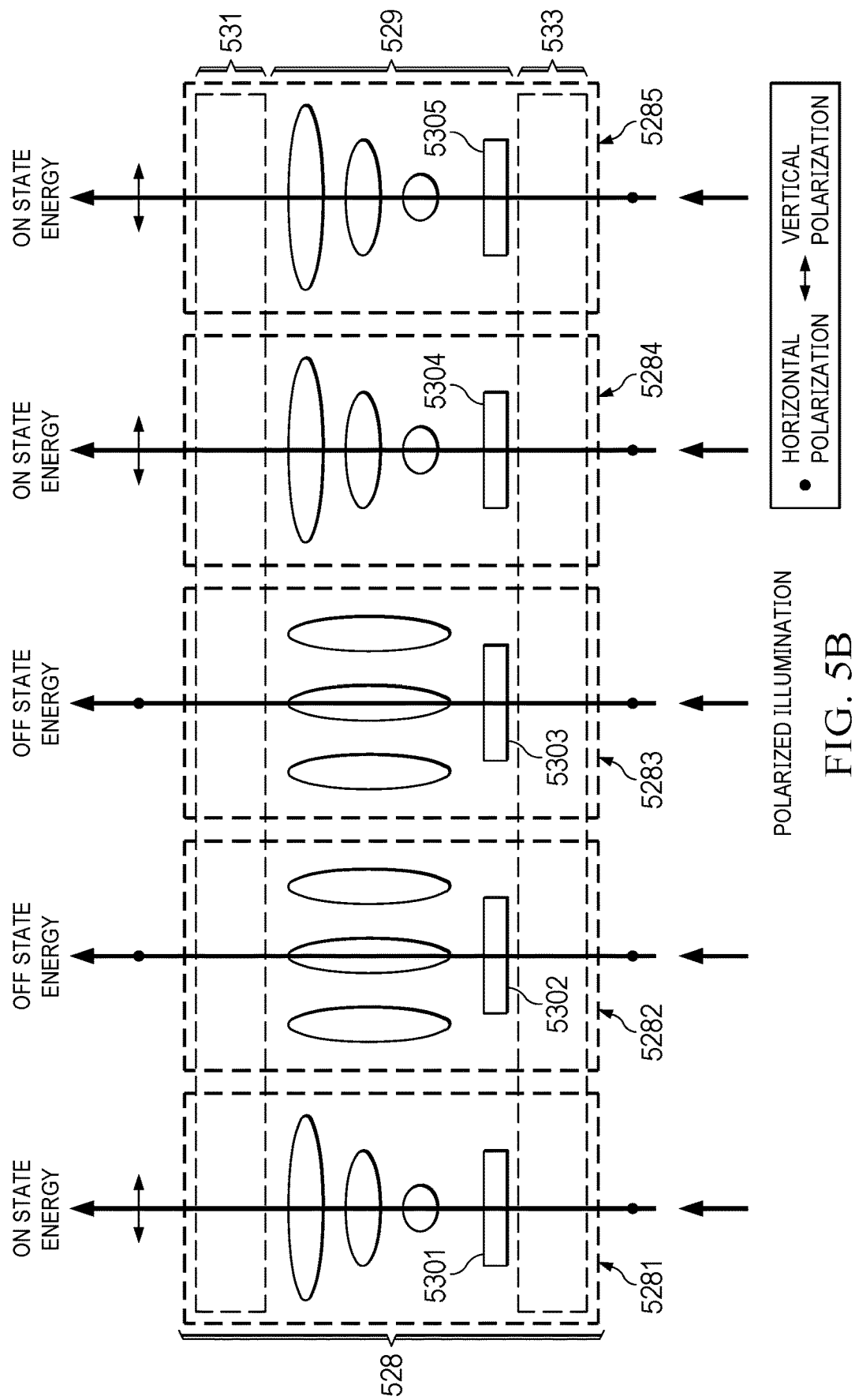
FIG. 5B illustrates the operations of an example transmissive liquid crystal device that is useful in certain arrangements.

FIG. 5B illustrates, in a side view, a portion of a transmissive liquid crystal display (LCD) used as an SLM. In FIG. 5B, an LCD device 528 is shown with pixels 5281, 5282, 5283, 5284 and 5285. Illumination light labeled "POLARIZED ILLUMINATION" is directed to the LCD device 528 from a bottom side (as the elements are oriented in FIG. 5B). The device 528 includes liquid crystals in a layer 529 between glass covers 533 and 531, which are transmissive to the illumination light.

In operation, the polarized illumination light enters the individual pixels 5281, 5282, 5283, 5284 and 5285, which are addressable pixels of the device 528. Glass cover and alignment layer 533 is shown with transparent electrodes 5301, 5302, 5303, 5304 and 5305 positioned in the pixels 5281, 5282, 5283, 5284 and 5285 to provide an electrically addressable cell for each pixel. The liquid crystal material 529 carries liquid crystals which can change orientation or twist in response to an electric field. The electric field can be applied using the transparent electrodes 5301, 5302, 5303, 5304 and 5305 and another transparent electrode that is attached to glass cover 531, which can be placed at a reference potential during operation. As shown in FIG. 5B, the polarized illumination can be in a horizontal polarization as indicated by the closed dots on the rays shown in FIG. 5B. When the polarized illumination transits a pixel in an on state, such as pixel 5281, which us indicated by the liquid crystals in layer 529 being aligned in a horizontal direction, the polarization of the light is changed to a vertical polarization, as indicated by the two headed arrows on the rays leaving pixel 5281, which corresponds to ON STATE ENERGY in the arrangement. When the polarized illumination light transitions a pixel in an off state, such as pixel 5282 in FIG. 5B, and the crystals in layer 529 in the pixel are arranged in a vertical alignment, and the polarization of the light is not changed, and the light that leaves the cell is still in the horizontal polarization, which corresponds to OFF STATE ENERGY in the arrangement. The different polarization of the light allows a system using the transmissive LCD device 528 to separate ON STATE ENERGY light from OFF STATE ENERGY light in the arrangements. In an alternative approach, the POLARIZED ILLUMINATION could be in the vertical polarization, and the light corresponding to the ON STATE ENERGY could be in the horizontal polarization, with the light corresponding to the OFF STATE ENERGY in the vertical polarization. These choices can be made during the design process.

Figure 5C:
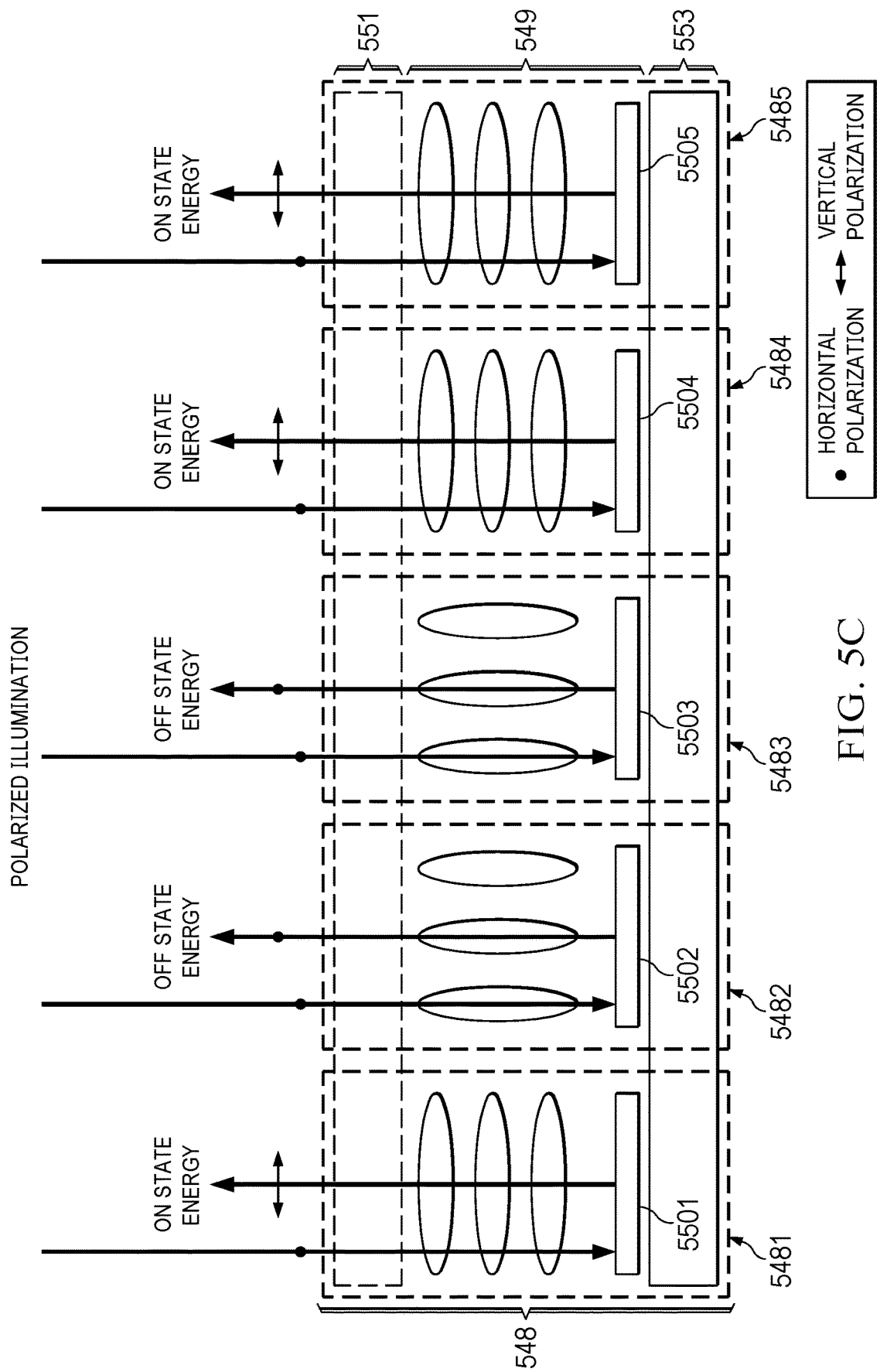
FIG. 5C illustrates the operations of an example reflective liquid crystal on silicon device that is useful in additional arrangements.

FIG. 5C illustrates, in a side view, an alternative SLM arrangement. In FIG. 5C, a portion of a reflective liquid crystal on silicon (LCOS) device 548 is shown, with five pixels 5481, 5482, 5483, 5484 and 5485. The reflective LCOS device 548 includes a layer of liquid crystals 549 and a glass cover 551, which can have a transparent electrode (not shown for simplicity of illustration) and optical elements such as optical aligners attached to it. A reflective semiconductor substrate 553 is shown with addressable electrodes 5501, 5502, 5503, 5504, 5505 corresponding to the pixels 5481, 5482, 5483, 5484, 5485.

In an example operation, the liquid crystals in layer 549 can have the orientation changed by applying a electric field. The illumination enters the device 548 as POLARIZED ILLUMINATION shown directed to the top side of the device 548 (as the elements are oriented in the side view shown in FIG. 5C). The illumination light is reflected by the reflective semiconductor substrate 553 and can have the polarization changed, or not, depending on the state of the pixels. For example, in pixel 5481, the liquid crystals are shown oriented in a horizontal direction, and the reflected light leaves pixel 5481 in a vertical polarization (changed from the horizontal polarization) as shown by the double ended arrows on the rays in FIG. 5C, corresponding to ON STATE ENERGY. In another example operation, the illumination light that enters the pixel 5482, which is in an off state as indicate by the liquid crystals being in a vertical orientation (as the elements are oriented in FIG. 5C), is reflected and leaves pixel 5482 in the horizontal polarization, as indicated by the closed dots on the rays in FIG. 5C, which corresponds to OFF STATE ENERGY. Because the light that corresponds to ON STATE ENERGY and the light that corresponds to OFF STATE ENERGY is in different polarization, a system using the arrangement of FIG. 5C, device 548, as an SLM, can direct the ON STATE ENERGY light and the OFF STATE ENERGY light in different directions. In an alternative approach, the POLARIZED ILLUMINATION could be in the vertical polarization, and the light corresponding to the ON STATE ENERGY could be in the horizontal polarization, with the light corresponding to the OFF STATE ENERGY in the vertical polarization. These choices can be made during the design process.

Figure 6:
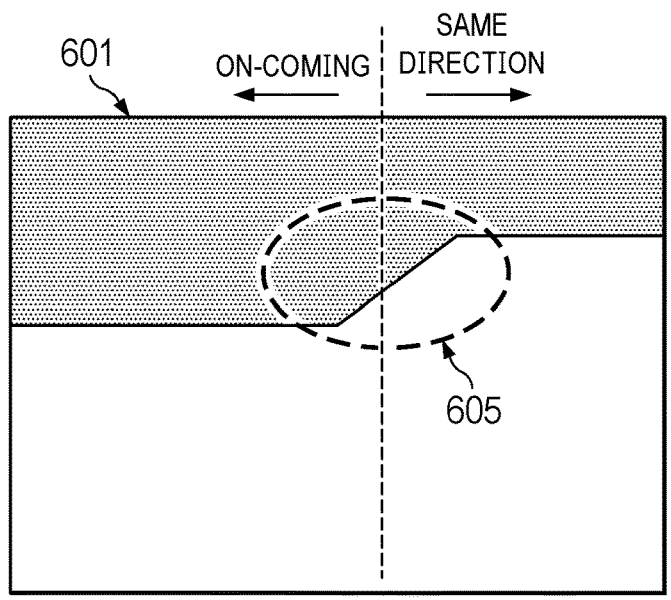
FIG. 6 illustrates, in a plan view, the illumination pattern displayed on a spatial light modulator for an example beam pattern.

FIG. 6 illustrates, in a plan view, an image pattern 601 that might be displayed on an SLM device to create a desired beam pattern. This example image pattern 601 can be used for an adaptive beam mode of operation in an automotive headlight. The upper portion of the image pattern 601 is dark, indicating that light from pixels in the upper portion of the SLM is off state light that is directed away from imaging optics. The pixels of the reflective SLM corresponding to the dark area are in an off state. Because a reflective SLM is subtractive, illumination light is directed toward all of the pixels for each image, so that the illumination energy used is the same whether or not the light from all of the pixels is projected by an imaging lens. A pattern with many dark pixels, such as the example image pattern 601 shown in FIG. 6, is necessarily inefficient when projected by an SLM in that the illumination energy used is the same as when a bright pattern (for example, with all of the pixels in the on state) is projected. In order to form patterns, an amplitude modulation SLM subtracts from illumination light provided by selected pixels, starting from a maximum brightness with all pixels in the on state. In FIG. 6, the portion of the pattern to the left of the dashed line is directed to illuminate the roadway in the adjacent lane where on-coming traffic is (indicated by the arrow labeled "on-coming" in FIG. 6), and the portion to the right of the dashed line is directed to illuminate the roadway in front of the vehicle (indicated by the arrow labeled "Same direction" in FIG. 6). In this example, the portion of the SLM that illuminates the adjacent lane is dimmed to avoid glare to on-coming vehicles by reducing the number of pixels in the on state. In the portion that illuminates the roadway in the same direction lane in front of the vehicle, the number of SLM pixels in the on state are increased, the pattern has an angled portion 605 that results in a shaped beam. The sloped angle indicates a transition region in the beam pattern from the on-coming lane to the same direction lane. The SLM displays patterns by placing some pixels in the off state, directing the off state illumination away from the projection path. An automotive headlight using an SLM such as in FIG. 3A can be inefficient when many pixels are in the off state, because the light projected from the on state pixels is reduced by the number of off state pixels, and conventionally, the off state light was not used.

Figure 7A:
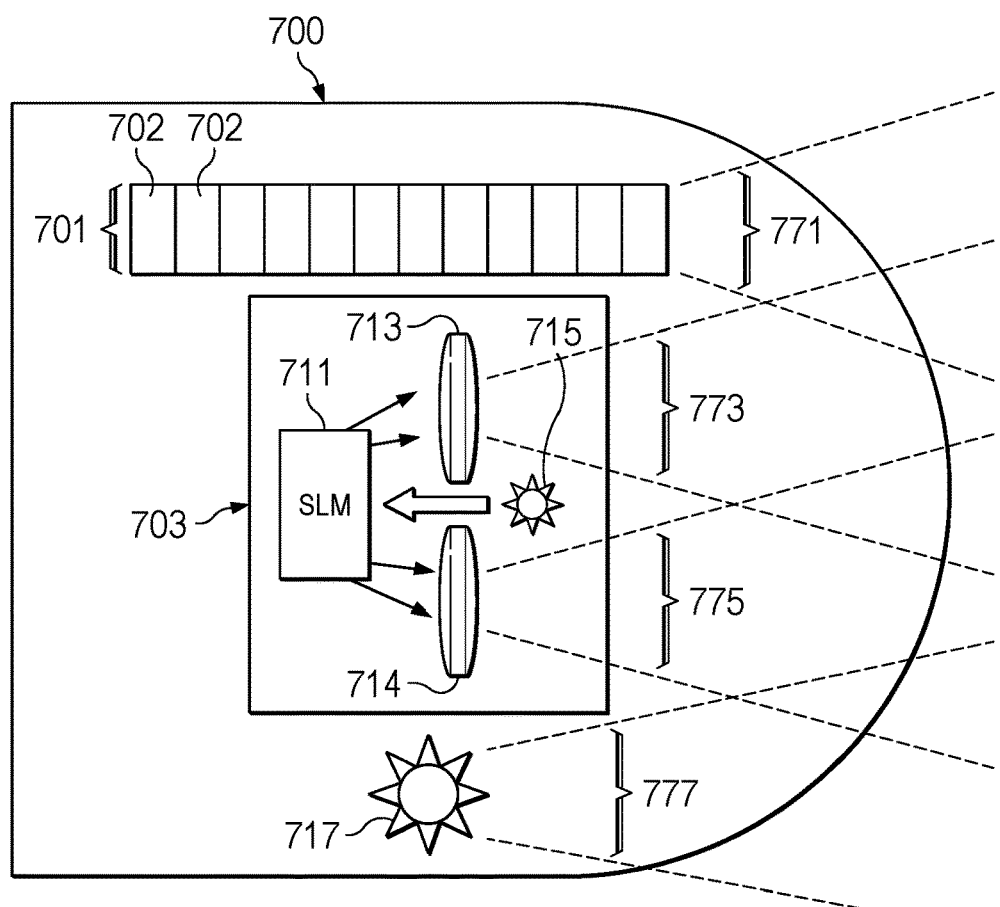
FIG. 7A illustrates, in a block diagram, an automotive headlight with an SLM forming an example arrangement.

FIG. 7A illustrates, in a block diagram, an example arrangement for a light source 700 including an SLM system 703. In the illustrated example, the light source 700 is an automotive headlight, while in alternatives the light source 700 can be used to provide light for other vehicles or applications, such as marine, rail, aviation, trucking, outdoor illumination, or factory illumination. In the arrangements, off state light from an SLM is used in a beam pattern, and therefore use of the arrangements increases efficiency. In FIG. 7A, the SLM system 703 includes an SLM subsystem 711, an illumination source 715, non-imaging optics 714, and imaging optics 713. The imaging optics 713 can include optical elements used in projection systems such as collimators, image sharpness lenses, color correction elements, and other optical elements that can be used to increase visibility and contrast of a projected image. Non-imaging optics 714 can include collimators and other lenses, however the non-imaging optics project light as a beam and the non-imaging optics 714 are therefore less critical, and components can be less expensive, than imaging optics 713. The SLM system 703 provides patterned light and/or graphic images projected from the light source 700. As is described above, a portion of the on state light from the SLM subsystem 711 is directed to high beam mode operations, and another portion of the on state light from SLM subsystem 711 is directed to a graphic image display region and to low beam mode operations. The portion of the on state light that is directed to high beam mode operations can be combined with light from matrix LED 701, which is implemented using an array or matrix of individual LED segments 702, these can be arranged in a row or in a grid pattern, and may vary from 10-80 or more segments 702. The matrix LED 701 outputs high intensity light for use in the high beam mode of operation, and the matrix LED 701 can be turned off, or power greatly reduced, in a low beam mode of operation. The individual segments 702 of matrix LED 701 can be deactivated, or power reduced to the individual segments, to reduce the high intensity light projected to avoid glare on an oncoming vehicle, as described above.

In the example arrangement of FIG. 7A, non-imaging optics 714 is arranged to receive off state light from SLM subsystem 711 and projects off state light 775. The off state light 775 is directed to form part of the base light of the projected beam pattern, and can be combined with base light 777 from the base light source 717. The SLM subsystem 711 can be implemented using a reflective LCOS device, a transmissive LCD device or by using a digital micromirror device (DMD). The illumination source 715 can be implemented using a bulb, a halogen lamp, lasers, or by using an LED or several LEDs. A blue LED combined with a yellow and/or green phosphor can be used to implement illumination source 715 to provide white light to the SLM subsystem 711. The illumination source 715 can be coupled to the SLM subsystem 711 by illumination optics (not shown in FIG. 7A).

The matrix LED 701 outputs matrix light 771 that can be used in a high beam portion of the beam pattern, the high beam portion is directed to illuminate objects and the roadway in the far distance. The imaging optics 713 directs on state light 773 to both the high beam portion of the beam pattern and to the low beam portion of the beam pattern as described above, and graphic images can be displayed in the low beam portion of the beam pattern (see, for example, graphic image area 123 in FIG. 1). The SLM system 703 can be varied so that more or less of the SLM light is in the high beam portion or the low beam portion, depending on the application. The non-imaging optics 714 directs off state light 775 to the low beam portion of the beam pattern and is directed to illuminate the roadway in the near distance and in the areas immediately around the front of the vehicle. The base light source 717 outputs base light 777 to the low beam portion of the beam pattern in the near distance. When the off state light 775 is increased (due to a particular pattern displayed on the SLM subsystem 711 having many dark regions) the power to the base light source 717 can be decreased, and when the intensity of the off state light 775 is decreased, the power to the base light source 717 can be increased to compensate. In one example, if no light from the SLM is needed in the beam pattern, all of the light from the SLM can be off state light, and the base light source 717 can be reduced or deactivated since the off state light is increased. For example, in a daylight scenario, the SLM 703 can provide base light as a daylight driving indicator, or in a parking scenario, the SLM 703 can provide base light without any light in the beam pattern from the SLM. This can be accomplished by displaying a "dark" pattern on the SLM for all of the pixels so that all of the light from the SLM is off state light.

Figure 7B:
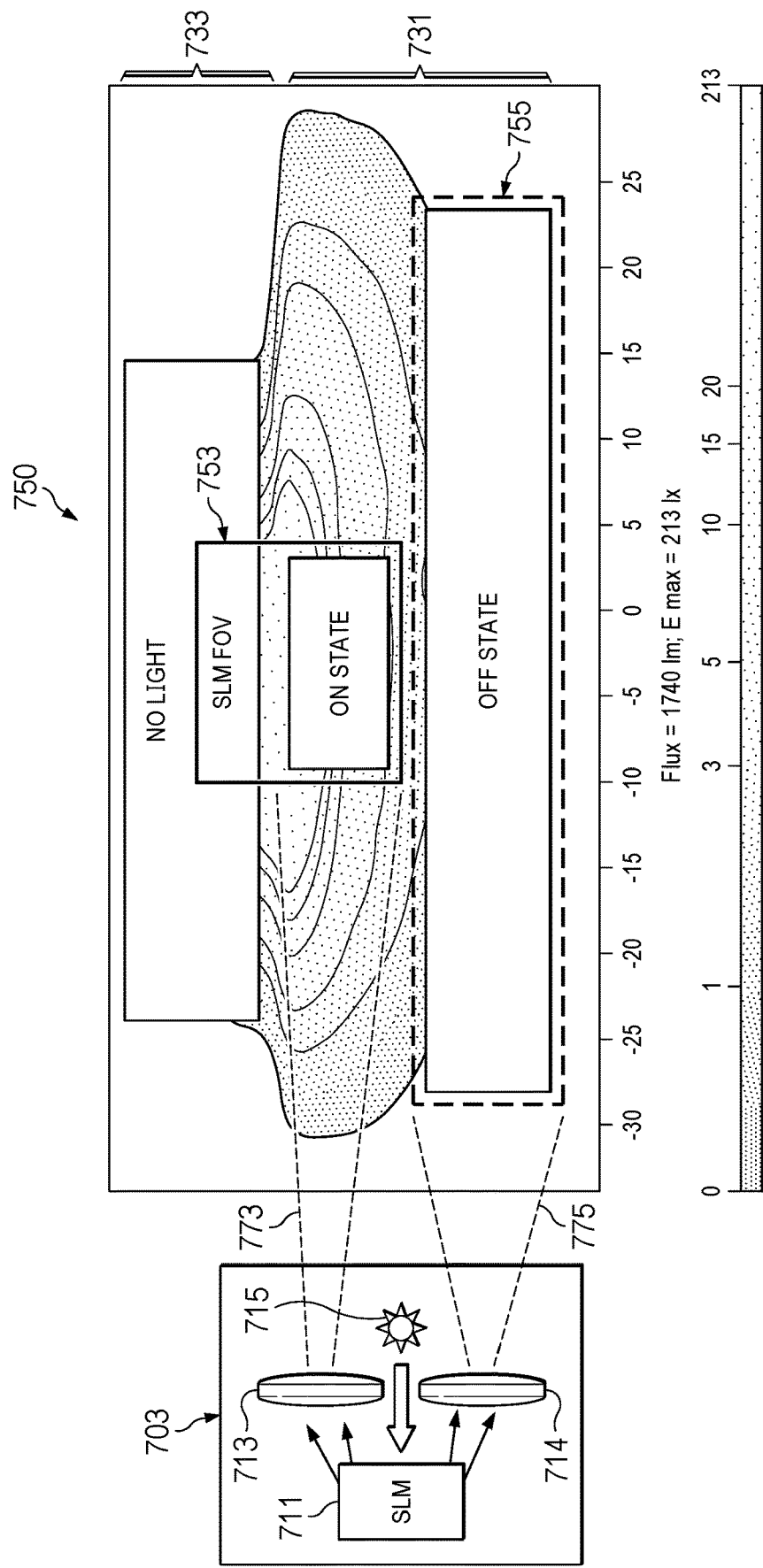
FIG. 7B illustrates, in a block diagram and an intensity diagram, the operation of a spatial light modulator in an automotive headlight using an arrangement for an example beam pattern.

FIG. 7B illustrates details for an example SLM system 703, and an intensity diagram for a particular beam pattern 750 to be projected in a low beam mode of operation. In FIG. 7B, SLM subsystem 711 in SLM system 703 receives illumination from illumination source 715. SLM subsystem 711 outputs on state light, which is modulated by a pattern displayed by the SLM, to imaging optics 713. On state light 773 from imaging optics 713 is projected as SLM light 753 in the SLM field of view (labeled SLM FOV) in the beam pattern 750. The beam pattern 750 illustrates a low beam mode of operation, where a portion of the patterned displayed on SLM subsystem 711 is dark, in FIG. 7B this is the portion that corresponds to the light that would appear in the upper portion of the SLM FOV which overlaps the high beam light portion 733 of the beam pattern 750. In the low beam mode of operation shown in FIG. 7B, this high beam light portion 733 of the beam pattern 750 is dark as indicated by the label "NO LIGHT" in FIG. 7B.

A portion of the on state light projected by the imaging optics 713 forms SLM light 753 in the beam pattern 750 as shown in the area labeled "ON STATE" in the SLM FOV. The ON STATE portion of the SLM light 753 in SLM FOV can display a patterned beam of light, and can display graphic images or messages as shown above.

In the arrangements, the SLM subsystem 711 also outputs off state pattern light from the pixels of the SLM that are in the off state, and the off state light 775 is directed from non-imaging optics 714 to the base light portion 755 of the beam pattern 750, and labeled "OFF STATE" in FIG. 7B. The base light portion 755 is shown at the bottom of the intensity diagram and corresponds to the portion of the beam pattern 750 that is directed to the near distance, that is closest to the driver and in front of the vehicle in an automotive headlight. The low beam light portion 731 of the beam pattern 750 includes the off state light 775. By using the off state light 775 from SLM system 703 to form part of the base light portion 755 of the beam pattern 750, the efficiency of the automotive headlight is increased. Power to a base light source (see base light source 717 in FIG. 7A) can be reduced, and since the power to the illumination source 715 is constant for the SLMs used in the arrangements, no additional power is consumed by the SLM system 703 in the arrangements when the off state light 775 is projected. In FIG. 7B, the graph illustrates the intensity, with a Flux of 1740 lm, the maximum Emax is 213 lux (lx) which is, as is shown by the fill patterns, in the central portion of the beam pattern 750. The graph at the bottom of FIG. 7B indicates the intensity values from 0 to the value 213 lx using a gradient fill pattern. The x-axis illustrates the field of view in degrees from an origin at the center of the diagram.

Figure 7C:
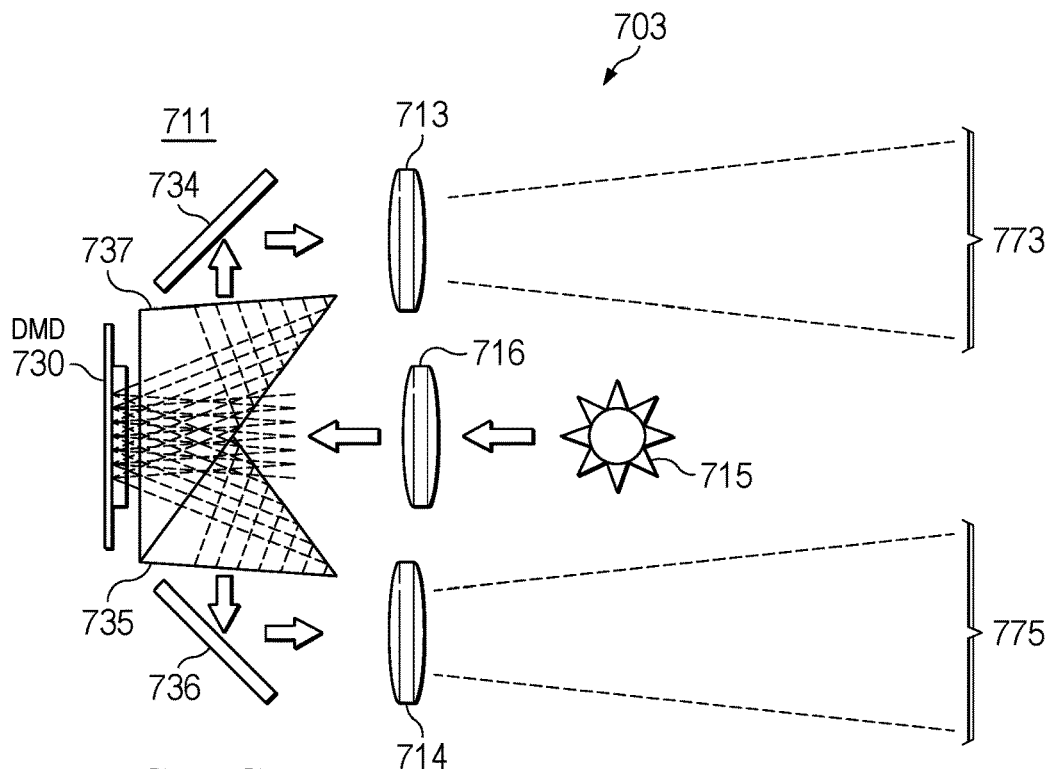
FIG. 7C illustrates, in a block diagram, additional details of an example arrangement for the spatial light modulator of FIG. 7B.

FIG. 7C illustrates further details of an example implementation. In this example arrangement for SLM system 703, SLM subsystem 711 includes a DMD 730, a first total internal reflection (TIR) prism 737, and a second TIR prism 735. In the example shown in FIG. 7C, the light from illumination source 715 is directed by illumination optics 716 to the surface of the DMD 730 at a normal angle. DMD 730 can include thousands or millions of digital micromirrors (not shown, see 508 in FIG. 5, for example) forming a two dimensional array of pixels, and includes a memory array (not shown) with addressable memory cells for storing image data associated with the pixels. The illumination source 715 can be, in alternative arrangements, provided at an angle other than a normal angle, such as is shown in FIG. 5 for example, and additional optical elements such as folding mirrors and prisms can be used to direct the illumination light to the surface of the DMD 730. The TIR prisms 735, 737 have an internal surface that totally reflects light (the prisms are total internal reflection or "TIR" prisms) that enters the prisms and strikes that reflective surface at certain angles. In the example arrangement, TIR prism 737 receives the illumination light from the illumination optics 716 at an external surface and that light traverses the TIR prism 737 to DMD 730. DMD 730 patterns the light to form on state patterned light and off state patterned light. The on state patterned light from DMD 730 enters the first TIR prism 737 at an angle due to the tilt of the on state micromirrors in the DMD, and is reflected upwards (as the elements are oriented in FIG. 7C) and exits the first TIR prism 737 at the upper surface. The light from the first TIR prism 737 is coupled to a first folding mirror 734. The first folding mirror 734 directs the on state patterned light to imaging optics 713, and forms on state light 773. The on state light 773 is projected from the imaging optics 713 as part of a projected beam as described above. In the example illustrated in FIG. 7C, the second TIR prism 735 receives the illumination light from the illumination optics 716, and the illumination light traverses the second TIR prism 735 and exits the second TIR prism 735 to the surface of the DMD 730. The off state patterned light from the DMD 730 then enters the second TIR prism 735 at an angle due to the tilt of the micromirrors in the DMD 730 and is reflected downwards (as the elements are oriented in FIG. 7C) and exits the TIR prism 735 at the bottom surface and is directed to second folding mirror 736. The second folding mirror 736 directs the off state patterned light to the non-imaging optics 714 and is output as off state light 775, which becomes part of the projected beam as described above.

Figure 7D:
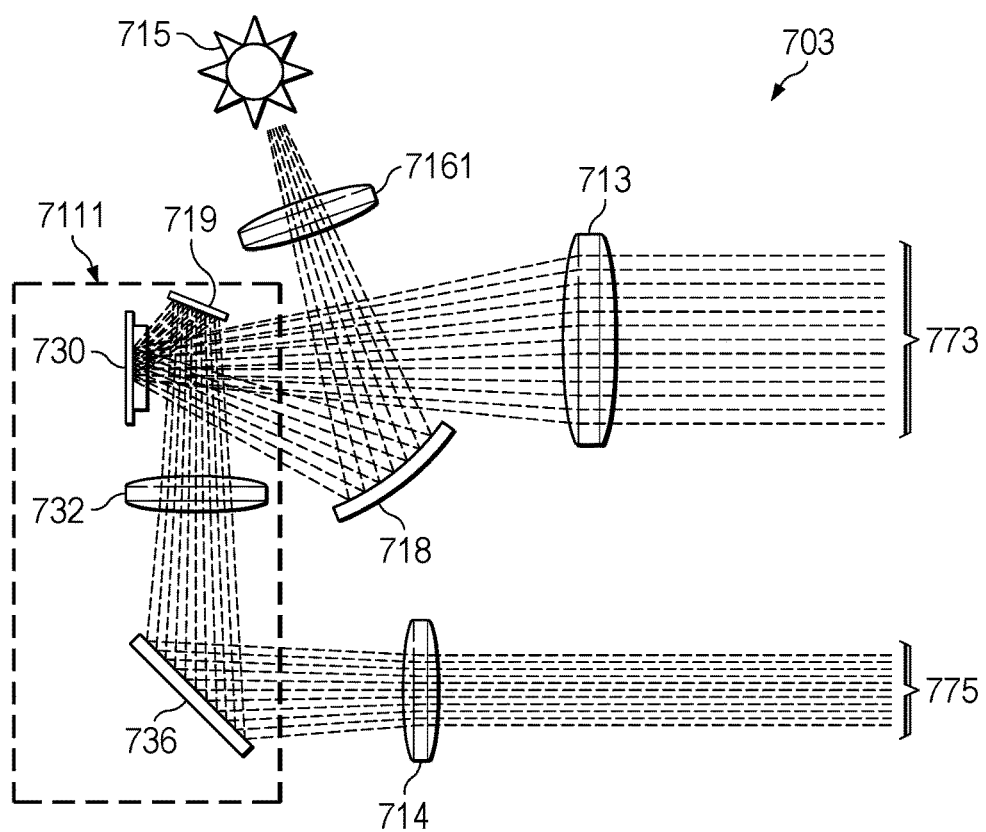
FIG. 7D illustrates, in a block diagram, details of an alternative spatial light modulator for use in an arrangement.
Figure 7E:
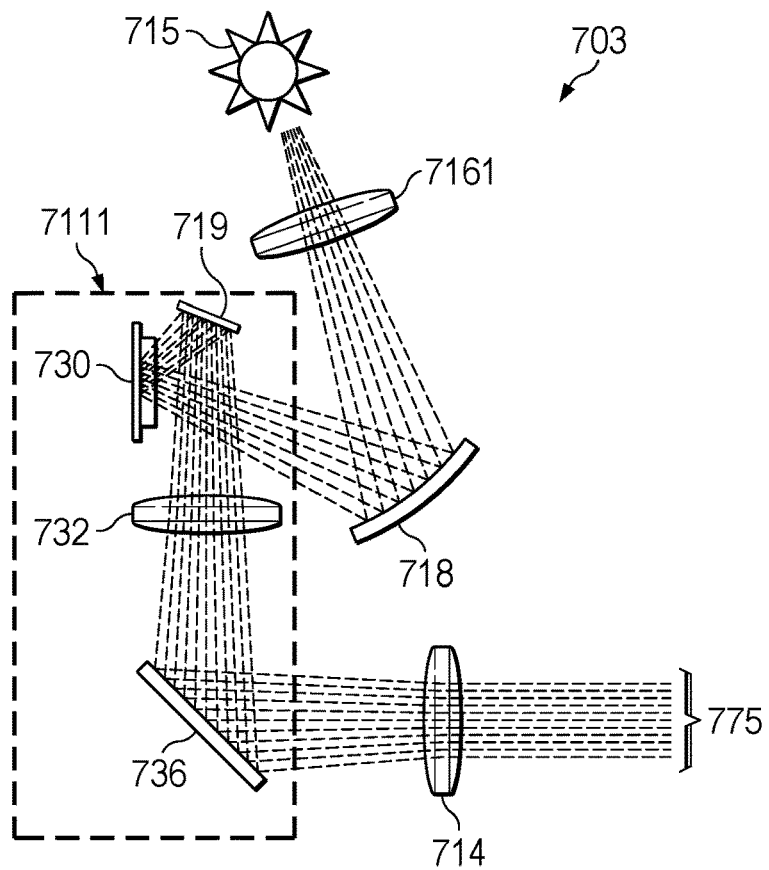
FIG. 7E illustrates further details of the off state beam path in the arrangement of FIG. 7D.

In FIGS. 7D-7E, an alternative configuration for the SLM system 703 is shown with an SLM subsystem 7111 as another example implementation of SLM subsystem 711 in FIG. 7B. In FIG. 7D, the illumination light from illumination source 715 is provided at an oblique angle with respect to a reflective surface of DMD 730. The illumination path includes illumination optics 7161 that focuses the light. A concave mirror 718 receives the light from illumination optics 7161 and directs the illumination light onto the surface of DMD 730 an angle. When displaying a pattern to form a desired beam pattern, DMD 730 reflects on state light and off state light, which is determined by the pattern being displayed on the DMD at a particular time. The on state light is reflected from the DMD 730 at a normal angle with respect to the DMD surface to the imaging optics 713. Imaging optics 713 can include projection optics (not shown for simplicity of illustration), which can focus, improve contrast, shape the beam, and can include collimators and color correction lenses. The imaging optics 713 are configured to project focused images at sufficiently high resolution to be clearly visible when projected onto a surface some distance from the SLM subsystem 7111. The on state light 773 is projected from the imaging optics 713. The off state light is reflected from the surface of the DMD 730 first upwards (as the elements are oriented in FIG. 7D), and then by use of a mirror 719, and collimating lens 732, directed downwards to a folding mirror 736 and into non-imaging optics 714. The non-imaging optics 714 can focus, make more uniform, shape and collimate the off state light to produce more parallel rays, but no images are projected and the characteristics of the optical elements in the non-imaging optics 714 are therefore less critical and can be less expensive than those used in imaging optics 713. Off state light 775 is then used to form part of the beam that is projected.

The use of the mirrors (folding mirrors 734, 736 in FIG. 7C) and optics (illumination optics 716, and TIR prisms 737, 735) in SLM subsystem 711 (see FIG. 7C) allows the on state light, which is patterned to project an image corresponding to the image displayed by DMD 730, and the off state light, to be separated from one another and to be separated from the incoming illumination light from illumination source 715. In contrast, in the arrangement of the SLM subsystem 7111 as implemented in FIG. 7D, no TIR prisms are needed, however the arrangement may require more mirrors and more area/volume in an SLM system than the arrangement of FIG. 7C. The off state light 775 is used as part of the base light in a beam pattern, as described above. A portion of the on state light 773 can provide graphic images or other symbols, as shown above, in both high beam and low beam mode operations, while another portion illuminates the high beam part of a beam pattern.

FIG. 7E illustrates the SLM system 703 with SLM subsystem 7111 as in FIG. 7D, to show further details of the off state light path. In FIG. 7E, the on state light is omitted to clarify the illustration. The illumination source 715 provides light that is collimated by illumination optics 7161 and reflected to the DMD 730 by concave mirror 718. The off state light from DMD 730 is directed upwards (as the elements are oriented in FIG. 7E) to mirror 719, which can be a biconic or cylindrical mirror. Mirror 719 collects the off state light from DMD 730 and is positioned to provide an optical pupil stop. The off state light leaves the mirror 719 and is directed downwards (as the elements are oriented in FIG. 7E) to a lens 732, which can be a biconic or cylindrical lens that shapes or collimates the off state light. Mirror 736, which folds the off state light path, can be a flat, biconic or cylindrical mirror. The off state light is then directed to the right side of the figure (as the elements are oriented in FIG. 7E) through non-imaging optics 714, which can be another biconic or cylindrical lens, that further shapes and focuses the off state light. The non-imaging optics 714 projects off state light 775. The intensity of the off state light varies with the pattern displayed on the DMD, and thus the off state light that is projected also varies with the intensity of the on state light beam projected.

In the arrangements both on state light from the SLM subsystem that is a patterned image projected by imaging optics, and off state light from the SLM subsystem that is directed away from the imaging optics to non-imaging optics, are used in a projected beam, greatly increasing the efficiency. The amount of light available from the off state light will vary with the patterns displayed on the SLM, but in some examples, the power used by the base light source can be reduced by up to 90 percent while projecting a low beam pattern (when compared to systems that do not use the off state light to illuminate the base light portion.) When the off state light available from the SLM system (see 703 in FIG. 7C, or 7D, for example) is less, the power to the base light source can be increased to compensate. The amount of off state light available will depend on how many pixels in the SLM are in the off state at a given time, which depends on the image pattern displayed by the SLM at a given time.

Figure 7F:
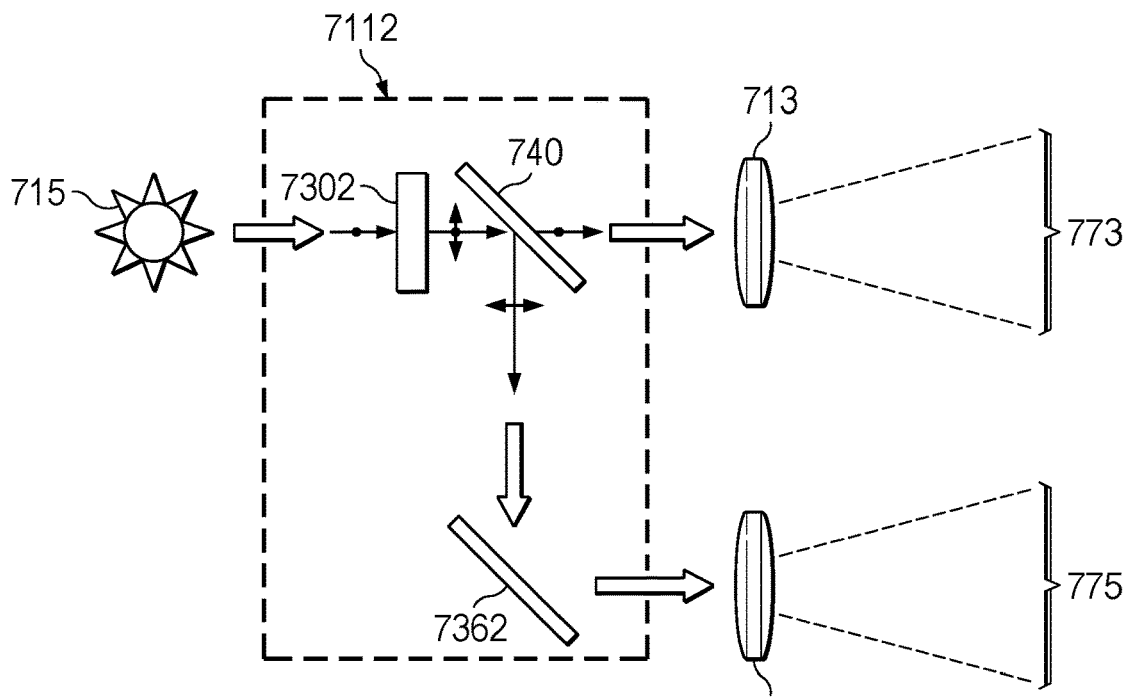
FIGS. 7F and 7G illustrate, in block diagrams, additional alternative SLM arrangements.
Figure 7G:
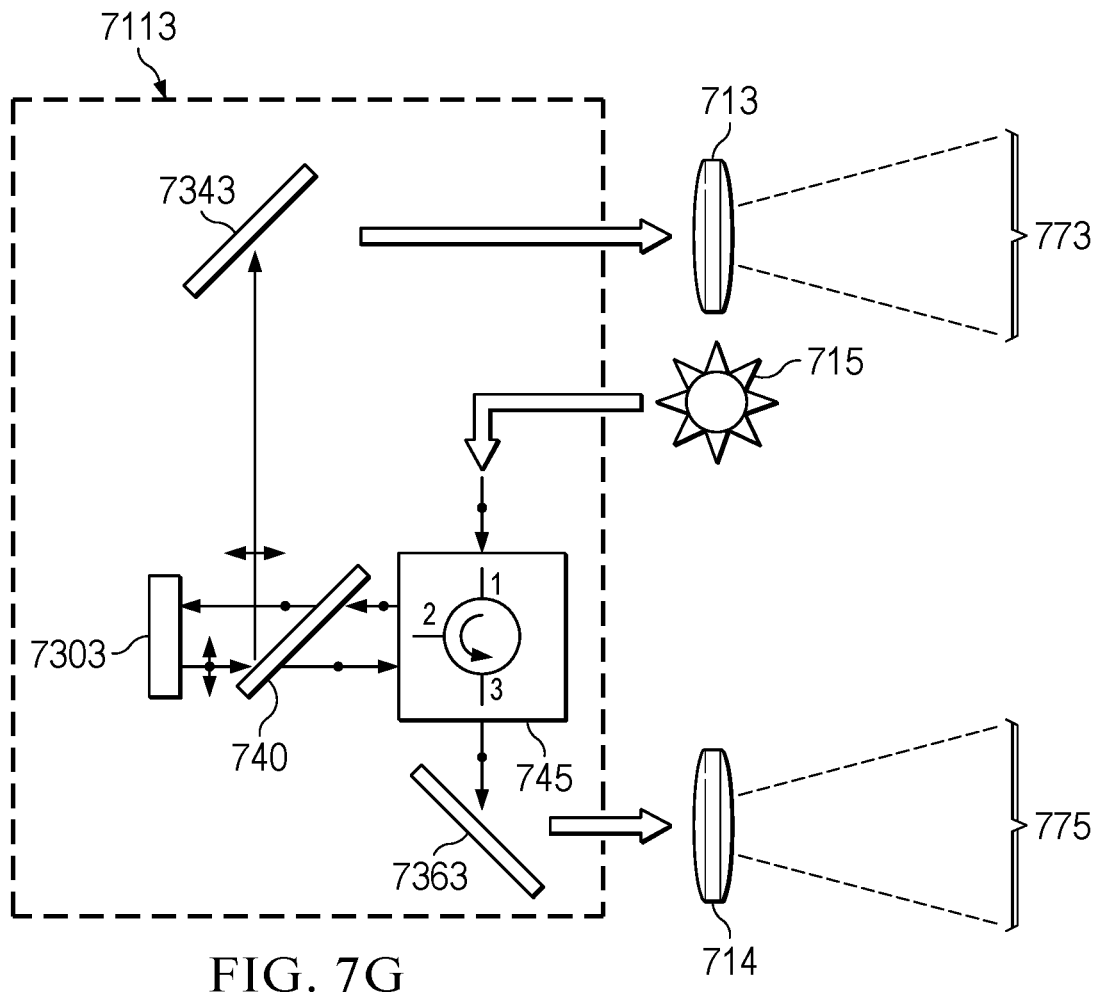

FIGS. 7F-7G illustrate arrangements for an SLM system using liquid crystal display (LCD) technology (FIG. 7F) or liquid crystal on silicon (LCOS) technology (FIG. 7G) to implement the SLM. In these arrangements, polarization differences in on state light and off state light are used to separate the light, in contrast to the DMD arrangements, which use angle of reflection differences to separate the on state light from the off state light. For similar elements, the reference numbers used are similar to those used in FIGS. 7C-7E, for similar elements, for ease of understanding.

In FIG. 7F, an SLM subsystem 7112 is implemented using a transmissive LCD device 7302. In an SLM using a transmissive LCD as the spatial light modulator, polarized illumination light traverses through individual cells in an LCD device and is modulated using polarization. Illumination source 715 directs polarized illumination light through the transmissive LCD 7302 which receives a pattern. LCD 7302 outputs on state light and off state light in two polarization states, on state light is output in horizontal polarization, as indicated by the filled circle shapes on the rays in FIG. 7F, and off state light is in vertical polarization, as indicated by the double ended arrow shapes on the rays in FIG. 7F. In the example shown, the on state light is shown in a horizontal polarization state, however, in alternative arrangements, the on state light can be in a vertical polarization state, while the off state light is in the horizontal polarization state, so long as the on state light and the off state light can be separated from one another. A polarization beam splitter (PBS) 740 is used to separate the on state light and the off state light, the on state light traverses the polarization beam splitter 740 without reflecting and is directed to imaging optics 713 and projected as on state light 773, and the off state light is reflected downwards from the PBS 740 (as the elements are oriented in FIG. 7F) to a folding mirror 7362, and then reflected to non-imaging optics 714 and off state light 775 is projected. Because the off state light and the on state light have different polarization, the elements in SLM subsystem 7112 can separate the off state light from the on state light, and the off state light 775 is projected from non-imaging optics 714.

FIG. 7G illustrates an additional arrangement using a reflective liquid crystal on silicon (LCOS) device to implement an SLM subsystem 7113. In the reflective LCOS device, light enters a liquid crystal layer and reflects from a reflective semiconductor layer beneath the liquid crystal layer with a polarity change or without a polarity change. The illumination source 715 is optically coupled to the LCOS device 7303 in the SLM subsystem 7113 by an optical circulator 745. In an optical circulator, light is received at and is output from optical ports, in an example optical circulator as shown in FIG. 7G, the light that enters a first port labeled "1" is output from the next port in the optical circulator, labeled "2", while light entering port 2 is output at the next port, labeled "3." Illumination light from illumination source 715 is shown with horizontal polarization as indicated by the filled circular shapes on the rays in FIG. 7G. The illumination light is received at port 1 of the optical circulator 745. The illumination light is output from port 2 of the optical circulator 745, labeled "2" in FIG. 7G, and is directed to polarization beam splitter 740. The polarization beam splitter 740 allows light entering with the horizontal polarization side to transition the element, while light in the vertical polarization is reflected at an angle, as shown in FIG. 7G. The polarized illumination light from the optical circulator 745 traverses the polarization beam splitter 740 without reflection and is coupled to the reflective LCOS device 7303, which displays a pattern. The on state light from the reflective LCOS device 7303 has vertical polarization, as indicated by the double ended arrows along the rays in FIG. 7G. The off state light, which is in horizontal polarization as indicated by the filled circular shapes along the rays, also leaves the LCOS device 7303, and both on state and off stage light are directed to the PBS 740. The on state light is reflected upwards (as the elements are oriented in FIG. 7G) to a first folding mirror 7343, and is reflected and coupled to the imaging optics 713, which projects on state light 773. The off state light traverses the PBS 740 without changing direction, and is coupled to the optical circulator 745, where the off state light enters port 2. The optical circulator 745 outputs the off state light from port 3, the off state light is then directed to a second folding mirror 7363 and is reflected to non-imaging optics 714, and projected as off state light 775.

The arrangements provide on state light and off state light from an SLM system that can be used in a projected beam from a light source, increasing efficiency. By separating the on state and off state light, and directing the off state light to be projected as part of the projected beam, the need for additional base light from base light sources can be reduced, and power can be reduced.

Figure 8:
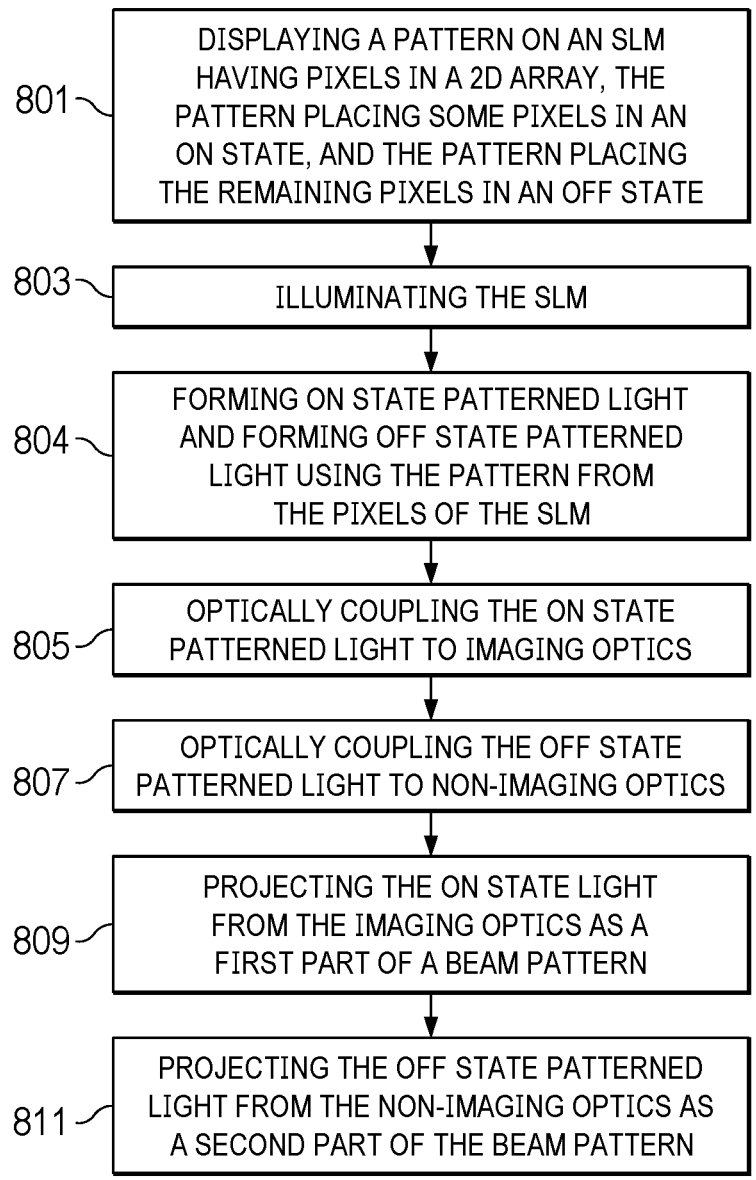
FIG. 8 illustrates, in a flow diagram, an example method arrangement.

FIG. 8 illustrates, in a flow diagram, selected steps of a method for projecting light using an arrangement. The method begins at step 801 by displaying a pattern on an SLM having pixels in a 2D array, the pattern placing some pixels in an on state, and the pattern placing the remaining pixels in an off state. The method continues at step 803 by illuminating the SLM. At step 804, the method continues by forming on state patterned light and forming off state patterned light using the pattern from the pixels of the SLM. At step 805, the method continues by optically coupling the on state patterned light to imaging optics. At step 807, the method continues by optically coupling the off state patterned light to non-imaging optics. At step 809, the method continues by projecting the on state patterned light from the imaging optics as a first part of a beam pattern. At step 811, the method continues by projecting the off state patterned light from the non-imaging optics as a second part of the beam pattern.

In the illustrated examples, a beam pattern is projected onto a roadway by an automotive headlight. However, in additional alternative arrangements, the beam can be projected by any light that projects patterned beams, such as spotlights, marine, aviation, railroad and trucking headlights, outdoor illumination lights, or factory illumination lights. The arrangements are of particular importance to lights used on moving vehicles such as in automotive, trucking, railroad, marine and aviation applications. The arrangements have particular application to lighting when graphic images are used in a projected beam, such as when navigation, warning, or position systems are used, when traffic information or control systems are used, or when routing information is used. The arrangements enable visual information to be presented to an operator or driver within a projected beam, allowing the operator of a vehicle to focus on the field of view in front of a vehicle without the need to look at a display or monitor to receive the information.

Figure 9:
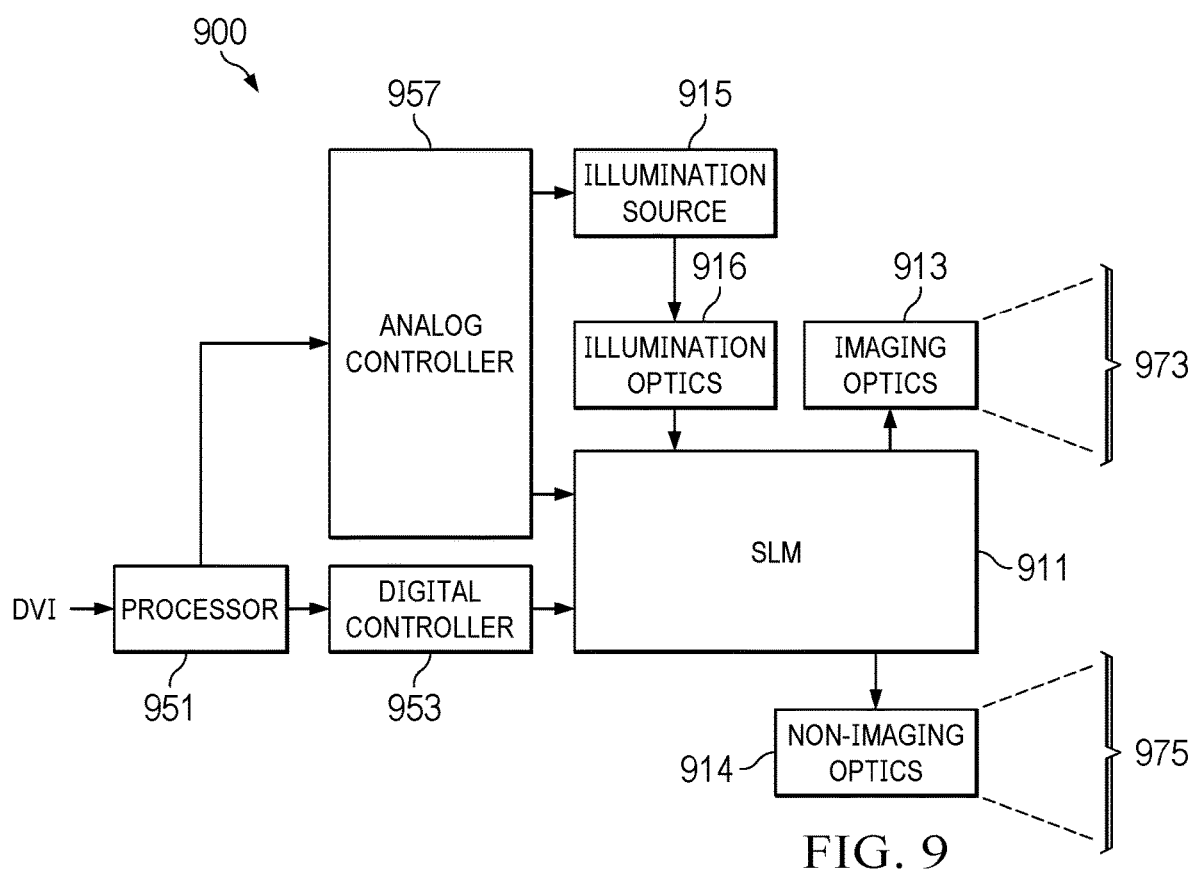
FIG. 9 illustrates, in a block diagram, a system for use in an arrangement.

FIG. 9 illustrates, in a block diagram, various elements of a system 900 for use with arrangements. SLM subsystem 911 can be implemented using a liquid crystal on silicon (LCOS) device, a transmissive LCD device, a microLED device, or a digital micromirror device. A processor 951, which can be implemented using a digital signal processor (DSP), a microprocessor, or a microcontroller unit (MCU), receives digital video input (DVI) signals. A digital controller 953 provides digital data to the SLM subsystem 911, including data for display. Analog controller 957 controls power signals to the SLM subsystem 911, and to the illumination source 915. Light from the illumination source 915 is optically coupled to the SLM subsystem 911 by illumination optics 916. On state patterned light from the on state pixels of SLM subsystem 911 is then optically coupled to imaging optics 913. The on state patterned light is then projected as on state light 973 and output from the system 900. Off state patterned light from pixels in the SLM subsystem 911 that are in the off state when the pattern is displayed is optically coupled to non-imaging optics 914. The off state patterned light is then projected from the system 900 as off state light 975.

In the arrangements, a beam pattern is formed using both on state patterned light from a SLM, which can include graphic images projected as part of the beam pattern, and off state light from the SLM, which is from off state pixels in the SLM that is also projected as part of the beam pattern. By using both on state light and off state light from an SLM in the beam pattern, the efficiency of a system using the arrangements is increased over systems that do not use the arrangements. In examples, automotive headlights can use the arrangements to implement adaptive driving beam (ADB) and smart headlight features. In alternative arrangements, other lights that project beams, including marine, aviation, trucking, railroad and spotlight applications, and other illumination systems, can use the arrangements.

Although the example illustrative arrangements have been described in detail, it should be understood that various changes, substitutions and alterations can be made herein without departing from the spirit and scope of the present application as defined by the appended claims. Accordingly, the appended claims are intended to include within their scope processes, machines, manufacture, compositions of matter, means, methods, or steps that provide equivalents to the examples disclosed.

What is claimed is:

1. A system comprising:
an illumination source configured to produce illumination light;
imaging optics;
non-imaging optics; and
a spatial light modulator (SLM) optically coupled to the illumination source, to the imaging optics, and to the non-imaging optics, the SLM comprising picture elements, the SLM configured to:
receive the illumination light;
direct, by a first portion of the picture elements, on state light towards the imaging optics; and
direct, by a second portion of the picture elements, off state light towards the non-imaging optics;
wherein the imaging optics is configured to project an image responsive to the on state light as a first portion of a beam; and
wherein the non-imaging optics is configured to project the off state light as a second portion of the beam.

2. The system of claim 1, wherein the SLM comprises a reflective liquid crystal on silicon (LCOS) device, a transmissive liquid crystal display (LCD) device or a digital micromirror device (DMD).

3. The system of claim 1, and further comprising:
a first total internal reflection (TIR) prism optically coupled to the illumination source, to the SLM, and to the imaging optics, the first TIR prism configured to receive the on state light from the SLM and to direct the on state light towards the imaging optics; and
a second TIR prism optically coupled to the illumination source, to the SLM, and to the non-imaging optics, the second TIR prism configured to receive the off state light from the SLM and to direct the off state light towards the non-imaging optics.

4. The system of claim 1, wherein the illumination source is configured to direct the illumination light towards the SLM at a normal angle with respect to a surface of the SLM.

5. The system of claim 1, wherein the imaging optics are configured to project a first portion of the on state light from the SLM to a high beam portion of the beam; and the imaging optics further configured to direct a second portion of the on state light from the SLM to a low beam portion of the beam.

6. The system of claim 5, wherein the SLM and the imaging optics are configured to display graphic images.

7. The system of claim 5, wherein in a high beam mode of operation, the imaging optics are configured to project on state light to both the high beam portion of the beam and to the low beam portion of the beam.

8. The system of claim 5, wherein in a low beam mode of operation, the SLM and the imaging optics are configured to project on state light to the low beam portion of the beam.

9. The system of claim 5, wherein in a low beam mode of operation, the non-imaging optics are configured to project the off state light to the low beam portion of the beam.

10. A vehicle comprising:
a headlight, comprising:
imaging optics;
non-imaging optics;
a spatial light modulator (SLM) having picture elements, the SLM optically coupled to the imaging optics and to the non-imaging optics, the SLM configured to display a pattern by placing a first portion of the picture elements in an on state and by placing a second portion of the picture elements in an off state, the SLM configured to direct on state light from the first portion of the picture elements towards the imaging optics, and the SLM configured to direct off state light from the second portion of pixel elements towards the non-imaging optics;
the imaging optics configured to project an image based on the on state light, wherein the image as an image portion of a beam; and
the non-imaging optics configured to receive the off state light and configured to project the off state light as a low beam portion of the beam;
a matrix LED configured to produce a high beam portion of the beam in a high beam mode of operation; and
a base light source configured to project light to the low beam portion of the beam in a low beam mode of operation.

11. The vehicle of claim 10, wherein in the high beam mode of operation, the matrix LED is configured to project light to the high beam portion of the beam, the imaging optics are configured to project images to the high beam portion of the beam and to the low beam portion of the beam, the non-imaging optics are configured to project light to the low beam portion of the beam, and the base light source is configured to project light to the low beam portion of the beam.

12. The vehicle of claim 11, wherein in the low beam mode of operation, the matrix LED is configured not to project light, the imaging optics are configured to project light to the low beam portion of the beam, but not to project light to the high beam portion of the beam, the non-imaging optics are configured to project light to the low beam portion of the beam, and the base light source is configured to project light to the low beam portion of the beam.

13. The vehicle of claim 10, and further comprising:
a sensor configured to detect an oncoming vehicle within the high beam portion of the beam; and
the imaging optics and the SLM are configured to project the image to the high beam portion of the beam with a dimmed portion placed where the oncoming vehicle is positioned within the high beam portion of the beam.

14. The vehicle of claim 10, wherein the SLM is configured to project graphic images to the low beam portion of the beam.

15. The vehicle of claim 10, wherein the SLM comprises a transmissive liquid crystal display (LCD) device, a reflective liquid crystal on silicon (LCOS) device, or a digital micromirror device (DMD).

16. A system comprising:
a controller;
a processor coupled to the controller;
an illumination source coupled to the controller, the illumination source configured to provide illumination light;

a spatial light modulator (SLM) coupled to the controller and optically coupled to the illumination source, the SLM configured to:

receive the illumination light;

display a pattern responsive to signals from the controller, the pattern formed by placing a first portion of picture elements of the SLM in an on state and placing a second portion of the picture elements in an off state;

direct on state light from the first portion of the picture elements in a first direction; and direct off state light from the second portion of the picture elements in a second direction different from the first direction;

imaging optics optically coupled to the SLM, the imaging optics configured to project an image responsive to light from the first portion of pixel elements, the image corresponding to the pattern displayed on the SLM; and non-imaging optics optically coupled to the SLM, the non-imaging optics configured to project the off state light.

17. The system of claim 16, wherein the SLM comprises a digital micromirror device (DMD), a transmissive liquid crystal display (LCD) device, or a reflective liquid crystal on silicon (LCOS) device.

18. The system of claim 16, wherein the imaging optics and the non-imaging optics are configured to project light for use in a headlight.

19. The system of claim 16, and further comprising:

at least one of a matrix LED and a base light source configured to project light along with the image projected by the imaging optics and the off state light projected by the non-imaging optics.

20. The system of claim 16, wherein the imaging optics and the SLM are configured to project graphic images in the image projected by the imaging optics.

* * * * *